(12) United States Patent
Matsumiya et al.

(10) Patent No.: US 7,318,285 B2
(45) Date of Patent: Jan. 15, 2008

(54) SURFACE PROFILE MEASURING INSTRUMENT

(75) Inventors: Sadayuki Matsumiya, Kawasaki (JP); Shiro Igasaki, Kawasaki (JP); Masaoki Yamagata, Kawasaki (JP)

(73) Assignee: Mitutoyo Corporation, Tokyo (JP)

( * ) Notice: Subject to any disclaimer, the term of this patent is extended or adjusted under 35 U.S.C. 154(b) by 0 days.

(21) Appl. No.: 11/469,076

(22) Filed: Aug. 31, 2006

(65) Prior Publication Data

US 2007/0056176 A1 Mar. 15, 2007

(30) Foreign Application Priority Data

Sep. 1, 2005 (JP) ............................. 2005-254016

(51) Int. Cl.
*G01B 5/20* (2006.01)
*G01B 5/00* (2006.01)

(52) U.S. Cl. .......................................... 33/561; 33/558
(58) Field of Classification Search ...................... None
See application file for complete search history.

(56) References Cited

U.S. PATENT DOCUMENTS

| | | | |
|---|---|---|---|
| 5,152,072 A | 10/1992 | McMurtry et al. | |
| 5,625,957 A | 5/1997 | Breyer et al. | |
| 5,952,589 A * | 9/1999 | Leung et al. | 33/561 |
| 6,314,800 B1 * | 11/2001 | Nishimura | 33/561 |
| 6,434,851 B1 * | 8/2002 | Nishina | 33/561 |
| 6,457,366 B1 | 10/2002 | Hidaka et al. | |
| 6,484,571 B1 | 11/2002 | Hidaka et al. | |
| 6,604,295 B2 * | 8/2003 | Nishimura et al. | 33/559 |
| 6,901,677 B2 * | 6/2005 | Smith et al. | 33/556 |
| 7,076,883 B2 * | 7/2006 | Yamamoto et al. | 33/561 |
| 2004/0040373 A1 * | 3/2004 | Saito | 33/558 |
| 2005/0204573 A1 * | 9/2005 | Kassai et al. | 33/559 |

FOREIGN PATENT DOCUMENTS

| | | |
|---|---|---|
| JP | 2000-199710 | 7/2000 |
| JP | 2003-240538 | 8/2003 |
| JP | 2003-294434 | 10/2003 |
| JP | 2004-061322 | 2/2004 |
| JP | 2005-037197 | 2/2005 |

* cited by examiner

*Primary Examiner*—Christopher W Fulton
(74) *Attorney, Agent, or Firm*—Rankin, Hill, Porter & Clark LLP

(57) ABSTRACT

Provided are a measuring section (210) including a vibrating contact-type probe having a measuring force detection circuit (219) which detects a measuring force acting to the contact portion (212); a moving unit (a three-dimensional drive mechanism (300), a vertical movement drive mechanism (220)) that moves the measuring section (210) relative to a workpiece surface (S); and a drive control unit (400) that controls the moving unit based on the magnitude of the measuring force output from the measuring force detection circuit (219). The drive control unit (400) includes: a scanning-measurement control section (410) that moves for scanning the contact portion along the workpiece surface (S) with the measuring force maintained at the designated scanning measuring force; and a touching-measurement control section (420) that conducts touching-measurements on the workpiece surface (S) in a repeated manner, in the measurements the contact portion (212) being adapted to intermittently contact the workpiece surface (S) at a touch detecting measuring force.

8 Claims, 12 Drawing Sheets

SURFACE PROFILE MEASURING INSTRUMENT

BACKGROUND OF THE INVENTION

1. Field of the Invention

The present invention relates to a surface profile measuring instrument.

For example, the invention relates to a surface profile measuring instrument that detects a workpiece surface using a contact-type probe to measure the profile of the workpiece surface.

2. Description of Related Art

There has been known a measuring instrument that scans the workpiece surface to measure a surface texture and a three-dimensional profile of the workpiece such as a roughness tester, a contour measuring machine, a roundness measuring machine and a coordinate measuring machine.

For such a measuring instrument, a probe is used as a displacement sensor that detects the workpiece surface based on small displacements of a contact portion that is in contact with the workpiece surface (Document: JP-A-2004-61322).

FIG. 9 shows a profile measuring instrument 100 using a probe.

The profile measuring instrument 100 includes: a probe 200; and a three-dimensional drive mechanism 300 as a movement mechanism that moves the probe 200 in the three dimensions along a workpiece surface S.

As shown in FIG. 10, the probe 200 is a vibrating contact-type probe that includes: a stylus 211 having a contact portion 212 at a tip end thereof; a stylus holder 213 that supports the stylus 211; a vibrator 214 provided for the stylus holder 213, the vibrator constantly vibrating the stylus 211 at a natural frequency in an axial direction of the stylus 211; and a detector 217 that detects a change in the vibration of the stylus 211 to output a detection signal.

The vibrator 214 includes: a piezoelectric element 215 provided to the stylus holder 213 to vibrate the stylus 211; and a vibration circuit 216 that applies to the piezoelectric element 215 an output signal (such as a pulse and a sinusoidal wave signal) at a predetermined frequency.

The detector 217 includes: a piezoelectric element 218 that converts the vibration of the stylus 211 to voltage; and a detection circuit 219 that detects the voltage from the piezoelectric element 218 to output a detection signal.

The three-dimensional drive mechanism 300 is a three-dimensional drive mechanism that includes an X, Y and Z direction slide mechanism generally used in coordinate measuring machines.

Each of the axes of the three-dimensional drive mechanism 300 is provided with a linear encoder that detects a drive amount.

In the arrangement described above, when the contact portion 212 is moved along the workpiece surface S as shown in FIG. 11, the detection signal changes as shown in FIG. 12 (D) by the positional relationship between the contact portion 212 and the workpiece surface S. From a state where the contact portion 212 is free (FIG. 12 (A)), the contact portion 212 is brought into contact with the workpiece surface S (FIG. 12 (B)). When the contact portion 212 contacts to the workpiece surface S at a predetermined measuring force (FIG. 12 (C)), the vibration of the contact portion 212 is suppressed, so that the detection signal reaches a predetermined reference level.

The reference level is set in advance as a level obtained by subtracting from a detection signal value detected in the free state (the non-contacting state) of the contact portion 212 a change amount in signal generated when the contacting portion 212 is pressed at the predetermined measuring force.

Note that the measuring force is a force at which the contact portion 212 is pressed to the workpiece surface S when the contact portion 212 is brought into contact with the workpiece surface S for detection of the workpiece surface S.

The contact portion 212 is moved for scanning along the workpiece surface S while being pressed to the workpiece surface S such that the detection signal value is at the reference level. When the detection signal reaches the reference level, positional information of the probe 200 is sampled from slide amounts of the X, Y and Z axes of the three-dimensional drive mechanism 300. A contact point between the contact portion 212 and the workpiece surface S is calculated from the sampled position information of the probe 200, whereby the profile of the workpiece surface S is illustrated.

The detection signal is damped differently depending on an angle at which the contact portion 212 contacts the workpiece surface S.

Specifically, since the stylus 211 is vibrated in the axial direction thereof, the vibration of the stylus 211 is suppressed to different extents depending on whether the contact portion 212 abuts on the workpiece surface S in the axial direction of the stylus 211 or in a direction deviated from the axial direction of the stylus 211.

Accordingly, for the vibrating contact-type probe 200, the reference level of the detection signal is set on the premise that the contact portion 212 contacts the workpiece in the axial direction of the stylus 211.

Hence, in the case where the contact portion 212 contacts the workpiece surface S in the axial direction of the stylus 211, the vibrating contact-type probe 200 can be moved for scanning such that the detection signal becomes the reference level in order to scan the workpiece surface S at a constant measuring force.

However, depending on how the workpiece surface S is slant, the contact portion 212 may abut on the workpiece surface S not in the axial direction of the stylus but in a direction deviated from the axial direction of the stylus 211.

In this case, only a force component (in the axial direction of the stylus) out of the force acting from the workpiece surface S to the probe 200 can exert an influence on the detection signal change. Accordingly, the contact portion 212 is pressed too strongly to the workpiece in controlling the defect signal to the reference level, so that the measuring force cannot be maintained constant.

Thus, when the measuring force cannot be maintained constant, the workpiece surface S may be damaged due to the too strong pressing and the stylus 211 may bend, preventing an accurate detection of the workpiece surface S. Therefore, the workpiece of which workpiece surface S can be measured by the vibrating contact-type probe 200 has been limited to a workpiece having a substantially flat surface.

SUMMARY OF THE INVENTION

An object of the present invention is to provide a surface profile measuring instrument which measures a profile of a workpiece surface, the surface including a slant portion, by using a contact-type probe.

A surface profile measuring instrument according to an aspect of the present invention includes: a measuring section including a stylus having a contact portion to contact a workpiece surface at a tip end and a measuring force detecting unit which detects a measuring force when the contact portion abuts on the workpiece surface; a moving unit which moves the measuring section relative to the workpiece surface; and a drive control unit which controls the moving unit based on the magnitude of the measuring force detected by the measuring force detecting unit. The contact portion is brought into contact with the workpiece surface to measure the workpiece surface. The drive control unit includes: a scanning-measurement control section that controls the moving unit such that the moving unit conducts a scanning-measurement in which the measuring force is a preset designated scanning measuring force and the contact portion is moved for scanning along the workpiece surface; and a touching-measurement control section that controls the moving unit such that the moving unit repeatedly conducts touching-measurements on the workpiece surface. In the touching measurements, the contact portion is brought into and then out of contact with the workpiece surface and the contact portion contacts the workpiece surface at a touch detecting measuring force set smaller than the designated scanning measuring force. The measuring force detecting unit has a predetermined measuring force detecting direction. The measuring force detecting unit detects the measuring force acting in the direction. When the contact portion contacts the workpiece surface in a direction along the measuring force detecting direction, the scanning-measurement control section conducts the scanning-measurement. When the contact portion contacts the workpiece surface in a direction deviated from the measuring force detecting direction, the touching-measurement control section conducts the touching-measurement.

In the above-described arrangement, the contact portion is adapted to contact the workpiece surface by the moving unit in order to measure the workpiece surface. Herein, the measurement is conducted while switching a measuring mode between the scanning-measurement in which the contact portion is moved to scan the workpiece surface and the touching-measurement in which the contact portion is moved to and from the workpiece surface to detect the workpiece surface. Specifically, when the workpiece surface is substantially perpendicular to the measuring force detecting direction and the contact portion contacts the workpiece surface in the measuring force detecting direction, the scanning-measurement is conducted. When the workpiece surface is deviated from a direction substantially perpendicular to the measuring force detecting direction and the contact portion contacts the workpiece surface in the direction deviated from the measuring force detecting direction, the touching-measurement is conducted.

In the scanning-measurement, to maintain the deformation amounts of the stylus and the workpiece constant in order to ensure the measuring accuracy, the contact portion needs to be moved along the workpiece surface such that the measuring force between the contact portion and the workpiece surface becomes constant at the preset designated scanning measuring force.

Note that the measuring force detecting unit that detects the measuring force between the contact portion and the workpiece surface can only detect the measuring force in a certain direction. When the contact portion abuts on the workpiece surface in the direction that the measuring force is detectable, the measuring force detecting unit can reliably detect the measuring force acting on the contact portion. Accordingly, the scanning-measurement in which the measuring force can be maintained constant at the designated scanning measuring force can be conducted based on the detected measuring force.

However, when the workpiece surface has a slant portion, it becomes impossible to cause the contact portion to contact the workpiece surface in the measuring force detecting direction.

In this case, only a force component in the measuring force detecting direction out of the measuring force generated between the workpiece surface and the contact portion is detectable. Accordingly, if the detected measuring force is adjusted to be the designated scanning measuring force, the contact portion is pressed too strongly into the workpiece surface, which prevents the scanning-measurement that requires the constant measuring force. Up to now, in the case in which the direction in which the contact portion contacts the workpiece surface is deviated from the measuring force detecting direction, the surface profile cannot be measured with high accuracy, thereby limiting a measurable surface profile of the workpiece.

In contrast, according to the aspect of the invention, when the direction in which the contact portion contacts the workpiece surface is deviated from the measuring force detecting direction due to the slant portion of the workpiece surface, the measuring mode is switched from the scanning-measurement to the touching-measurement. In the touching-measurement, the touch detecting measuring force is set to be a value smaller than the designated scanning measuring force, so that it is possible to detect the contact of the contact portion to the workpiece surface by detecting the small measuring force. When the direction in which the contact portion contacts the workpiece surface is deviated from the measuring force detection force, only the force component in the measuring force detecting direction out of the total measuring force can be detected by the measuring force detecting unit. However, the touch of the contact portion to the workpiece surface can be detected when the force component reaches the touch detecting measuring force that is set as the small value, thereby preventing the contact portion from being pressed too strongly into the workpiece surface. In the touching-measurement, since the contact portion and the workpiece surface are not abutted to each other too strongly, deformations of the contact portion and the workpiece can be quite small, so that the workpiece surface can be accurately detected.

As described above, the aspect of the invention ensures not only the scanning-measurement of the workpiece surface but also the touching-measurement of the workpiece surface including a portion immeasurable in the scanning-measurement with high accuracy.

Note that the measuring force detecting unit may vibrate the stylus in the axial direction of the stylus at a natural frequency and may detect the measuring force based on the change in the vibration level generated at the time when the contact portion abuts on the workpiece surface. In this case, the measuring force detecting direction becomes parallel to the axial direction of the stylus. Alternatively, the measuring force detecting unit may include a strain gauge for detecting distortion of the stylus and may detect the measuring force based on the detected distortion amount by the strain gauge. In this case, the measuring force detecting direction becomes the direction in which the strain gauge detects the distortion.

According to an aspect of the invention, the surface profile measuring instrument may preferably further includes: a displacement detector which detects a displacement of the contact portion to output a displacement detection signal. The touching-measurement control section may preferably include a contact detecting section which outputs a touch detection signal when the measuring force reaches the touch detecting measuring force. The drive control unit may preferably include: a counter which counts the displacement detection signal to calculate a position of the contact portion; a latch counter which receives the touch detection signal and latches the position of the contact portion which is counted by the counter; and a profile analyzing section which calculates a surface profile of the workpiece based on the position of the contact portion calculated by the counter and the position of the contact portion latched by the latch counter.

In the above-described arrangement, the displacement of the measuring section is detected by the displacement detector and the counter counts the displacement detection signal from the displacement detector to obtain the actual position of the measuring section. In the touching-measurement of the workpiece surface, the contact portion is brought from a position apart from the workpiece surface toward the workpiece surface into contact with the workpiece surface and when the measuring force detected by the measuring force detecting unit reaches the touch detecting measuring force, the contact detecting section outputs the touch detection signal. And, when the latch counter receives the touch detection signal, the latch counter latches the count value by the counter.

In such an arrangement, since the position of the contact portion at the time when the touch detecting measuring force is detected by the contact of the contact portion to the workpiece surface, the surface profile of the workpiece can be obtained based on the latched data.

According to an aspect of the invention, in the surface profile measuring instrument, the drive control unit may preferably include a switching section for selecting the scanning-measurement control section or the touching-measurement control section as the one to be operated. The switching section may preferably be switched in accordance with a selection by a user depending on the profile of the workpiece surface.

In the above-described arrangement, the user selects which portion of the workpiece surface is to receive the scanning-measurement and which portion thereof is to receive the touching-measurement by judging from the tilt angle and the curvature of the workpiece surface. In addition, the user can select the measuring mode by arbitrarily switching the switching section. Hence, as compared with, for example, a case in which the profile measuring instrument is adapted to repeat the scanning-measurement and the touching-measurement to automatically select the most suitable measuring mode, the measuring mode can be selected more speedily and appropriately, thereby ensuring an effective measurement.

According to an aspect of the invention, in the surface profile measuring instrument, the drive control unit may preferably include: a switching section for selecting the scanning-measurement control section or the touching-measurement control section as the one to be operated; and a switching control section which controls the switching of the switching section. The switching control section may preferably switch and control the switching section based on a change in the measuring force detected by the measuring force detecting unit.

Herein, the measuring force detecting unit may be adapted, for example, to vibrate the stylus in the axial direction thereof and to detect the measuring force between the contact portion and the workpiece surface in accordance with change in vibration level in the axial direction of the stylus.

In the above-described arrangement, when the contact portion contacts the workpiece surface and the vibration of the stylus is suppressed, the vibration level becomes small. Due to the difference in the vibration, the measuring force acting to the contact portion from the workpiece surface can be detected. Note that since the stylus is vibrated in the axial direction thereof, when the contact portion contacts the workpiece surface in the axial direction of the stylus, the vibration of the stylus is suppressed by the force acting to the contact portion from the workpiece surface. However, when the contact portion contacts the workpiece in a direction deviated from the axial direction of the stylus, only a force component in the axial direction of the stylus out of the force acting to the contact portion from the workpiece surface contributes the suppression of the vibration of the stylus.

Accordingly, when the contact portion contacts the workpiece surface in a direction deviated from the axial direction of the stylus, the measuring force between the contact portion and the workpiece surface cannot be accurately detected and the detected vibration level of the stylus becomes weak. Hence, when the contact portion contacts the workpiece surface in the axial direction of the stylus, where the measuring force can be accurately detected, the scanning-measurement can be conducted. While, when the contact portion contacts the workpiece surface in a direction deviated from the axial direction of the stylus, the scanning-measurement cannot be conducted, so that the touching-measurement needs to be alternatively employed.

In contrast, according to the aspect of the invention, since the switching control section controls the switching section based on the measuring force detected by the measuring force detecting unit, it is not necessary for the user to judge and switch, which simplifies the measurement. Owing to the automatic switching, even when the surface profile cannot be measured in the scanning-measurement, the profile measurement can be automatically conducted in the touching-measurement.

According to an aspect of the invention, in the surface profile measuring instrument, the drive control unit may preferably include: a switching section for selecting the scanning-measurement control section or the touching-measurement control section as the one to be operated; and a switching control section which controls the switching of the switching section. The switching control section may preferably switch and control the switching section based on the surface profile of the workpiece.

Herein, controlling of the switching section based on the surface profile of the workpiece by the switching control section may be, for example, a switching between the scanning-measurement and the touching-measurement which is made based on the curvature of the workpiece surface and the angle between the workpiece surface and the measuring force detecting direction both obtained through the calculation of the surface profile of the workpiece based on the already-measured measuring data. Alternatively, the curvature and the tilt angle of the workpiece surface may be obtained from the design data, specifically by obtaining the surface profile of the workpiece from the design data of the workpiece.

In the above-described arrangement, when the surface profile of the workpiece includes a large curvature or a large tilt angle, it means that the contact portion contacts the workpiece surface in the direction deviated from the axial direction of the stylus. Accordingly, the measuring force acting between the contact portion and the workpiece surface cannot be accurately detected by the measuring force detection unit, so that the scanning-measurement cannot be conducted with the measuring force maintained constant at the designated scanning measuring force.

In contrast, according to the aspect of the invention, since the surface profile of the workpiece is analyzed to switch to the touching-measurement based on, for example, the curvatures or the tilt angles of the workpiece, it is not necessary for the user to judge and switch, thereby simplifying the measurement. Owing to the automatic switching, even when the surface profile cannot be measured in the scanning-measurement, the profile measurement can be automatically conducted in the touching-measurement.

According to an aspect of the invention, in the surface profile measuring instrument, the scanning-measurement control section may preferably change the designated scanning measuring force in accordance with an angle formed by the workpiece surface and the measuring force detecting direction.

In the above-described arrangement, the designated scanning measuring force in the scanning-measurement is changed in accordance with the angle between the workpiece surface and the measuring force detecting direction. For example, when the contact portion contacts the workpiece surface in the direction deviated from the measuring force detecting direction, the designated scanning measuring force is changed to take a smaller value. When the contact portion contacts the workpiece in the direction deviated from the measuring force detecting direction, the force component in the measuring force detecting direction out of the force acting to the contact portion from the workpiece surface can be detected as the measuring force. Hence, if the pressing amount of the probe is controlled such that the force component in the measuring force detecting direction becomes the designated scanning measuring force, the force acting between the contact portion and the workpiece surface becomes larger than the designated scanning measuring force, so that the scanning-measurement that requires a constant measuring force cannot be conducted.

In contrast, according to the aspect of the invention, the designated scanning measuring force is changed in accordance with the angle between the workpiece surface and the measuring force detecting direction, so that the measuring force acting between the contact portion and the workpiece surface is maintained constant, thereby ensuring a scanning-measurement in which the measuring force is accurately maintained constant.

According to an aspect of the invention and based on the same principle as described above, the touching-measurement control section may preferably change the touch detecting measuring force in accordance with the angle formed by the workpiece surface and the measuring force detecting direction.

According to an aspect of the invention, the moving unit includes: a fine feed mechanism which finely moves the measuring section; and a coarse feed mechanism which moves the fine feed mechanism and the measuring section more coarsely than the fine feed mechanism.

Herein, the fine feed mechanism may be preferably a feed mechanism that has high response speed. For example, the fine feed mechanism may be a piezoelectric actuator using a piezoelectric element.

The coarse feed mechanism may be an electromagnetic actuator.

In the above-describe arrangement, since the fine feed mechanism and the coarse feed mechanism are provided, in the scanning-measurement, the fine feed mechanism, of which response speed is high, can finely move the contact portion for small ridges and valleys of the workpiece surface, and the coarse feed mechanism, which can process a large change, can process a large profile change of the workpiece surface (such as an undulation). Hence, the contact portion can be moved for scanning along the workpiece surface accurately and speedily.

DETAILED DESCRIPTION OF PREFERRED EMBODIMENT(S)

Embodiments of the present invention, which are illustrated in the figures, will be described below with reference to numerals assigned to components in the figures.

First Embodiment

A first embodiment of a surface profile measuring instrument of the invention will be explained.

Figure 1:
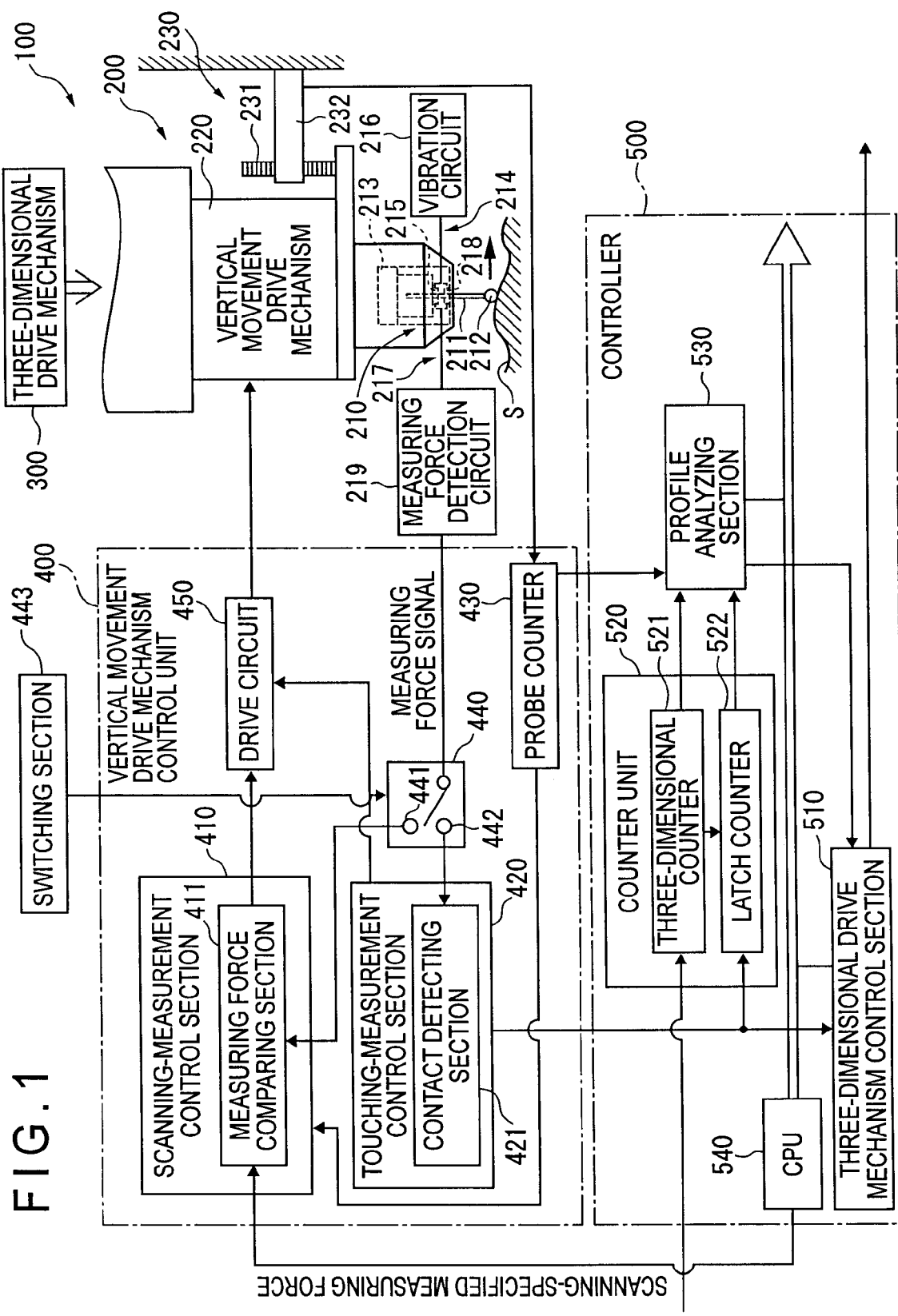
FIG. 1 shows an arrangement of a first embodiment of a surface profile measuring instrument according to the present invention.

FIG. 1 shows an arrangement of the first embodiment of a surface profile measuring instrument 100 of the invention.

Note that the first embodiment will be described by exemplifying a measurement in which a workpiece having a substantially flat surface is disposed substantially horizontally and a probe 200 is adapted to approach a workpiece surface S from the upper side of the workpiece surface S.

The surface profile measuring instrument 100 includes: the probe 200 that conducts a detection on the workpiece surface S while moving with a vertical movement drive mechanism 220 a measuring section 210 to abut on the workpiece surface S; a three-dimensional drive mechanism 300 that moves the probe 200 in the three dimensions; a vertical movement drive mechanism control unit 400 that drives the vertical movement drive mechanism 220; and a controller 500 that controls the entire operation of the surface profile measuring instrument 100.

The probe 200 includes: the measuring section 210 that contacts the workpiece surface S to detect a measuring force on the workpiece surface S; the vertical movement drive mechanism 220 that moves the measuring section 210 vertically in accordance with the profile of the workpiece surface S; and a displacement amount sensor 230 that detects a vertical displacement amount of the measuring section 210.

The measuring section 210 herein is the aforesaid vibrating contact-type probe 200 that is described in "2. Description of Related Art." The measuring section 210 includes: a stylus 211 having a contact portion 212 at a tip end; a stylus holder 213 that supports the stylus 211; a vibrator 214 that is provided to the stylus holder 213 and constantly vibrates the stylus 211 in an axial direction at a natural frequency; and a detector 217 that detects a change in vibration of the stylus 211 to output a detection signal.

The vibrator 214 includes: a piezoelectric element 215 that is provided to the stylus holder 213 and vibrates the stylus 211; and a vibration circuit 216 that applies to the piezoelectric element 215 an output signal (such as a pulse and a sinusoidal wave signal) of a predetermined frequency.

The detector 217 includes: a piezoelectric element 218 that converts the vibration of the stylus 211 to voltage; and a measuring force detection circuit 219 that detects the voltage from the piezoelectric element 218 to output a detection signal.

The measuring force detection circuit 219, which detects the voltage from the piezoelectric element 218, outputs a difference between the voltages detected when the contact portion 212 is unaffectedly vibrated and when the contact portion 212 is in contact with the workpiece surface S in a suppressed manner as information on the measuring force that the contact portion 212 receives from the workpiece surface S. For example, referring to FIG. 2, the measuring force detection circuit 219 detects the measuring force based on a value obtained by subtracting from a voltage level L1 detected when the contact portion 212 is not in contact with the workpiece surface S a reference value L2 that is a voltage level detected when the contact portion 212 is pressed into the workpiece surface S at a predetermined measuring force.

The vertical movement drive mechanism 220 is a mechanism for vertically moving the measuring section 210. For example, the vertical movement drive mechanism 220 drives the measuring section 210 in vertical directions by expansion and contraction of the piezoelectric element or vertical movements of a movable coil of an electromagnetic actuator.

The vertical movement drive mechanism 220 is provided to the three-dimensional drive mechanism 300 that moves the probe 200 in the X, Y and Z directions.

The three-dimensional drive mechanism 300 and the vertical movement drive mechanism 220 form a moving unit.

The vibrator 214 and the detector 217 form a measuring force detecting unit.

The displacement amount sensor 230 is a linear encoder including: a scale 231 that is vertically moved together with the measuring section 210; and a detector head 232 that detects a displacement of the scale 231.

The three-dimensional drive mechanism 300 herein has the same arrangement as that of the three-dimensional drive mechanism described in "2. Description of Related Art" including the X, Y and Z direction slide mechanism.

The vertical movement drive mechanism control unit 400 includes a scanning-measurement control section 410, a touching-measurement control section 420, a probe counter 430, a switching section 440 and a drive circuit 450.

The scanning-measurement control section 410 controls the vertical movement drive mechanism 220 such that the workpiece surface S is scanning-measured while the contact portion 212 of the measuring section 210 is abutted on the workpiece surface S with a predetermined designated scanning measuring force that is set in advance.

The scanning-measurement control section 410 includes a measuring force comparing section 411.

The measuring force comparing section 411 is input with a measuring force signal detected by the measuring force detection circuit 219 and a designated scanning measuring force signal from the outside. The measuring force comparing section 411 compares the measuring force signal from the measuring force detection circuit 219 with the designated scanning measuring force signal from the outside and outputs a drive signal to the drive circuit 450 such that the measuring force becomes constant at the designated scanning measuring force.

For example, when the detected measuring force is larger than the designated scanning measuring force, the measuring section 210 is moved upward to make the contact portion 212 be less pressed into the workpiece surface S, while when the detected measuring force is smaller than the designated scanning measuring force, the measuring section 210 is moved downward to press the contact portion 212 more strongly into the workpiece surface S, thereby adjusting the measuring force become constant at the designated scanning measuring force.

Figure 2:
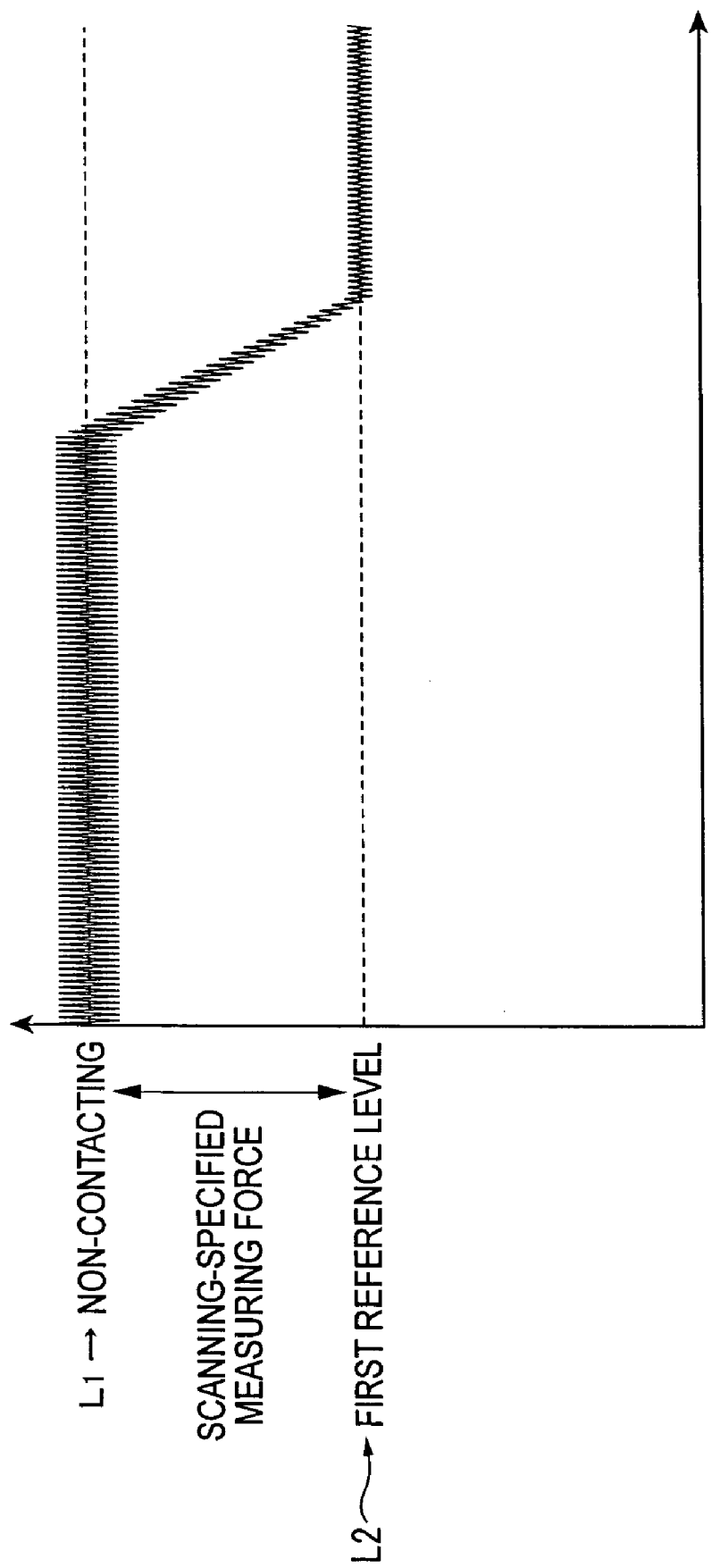
FIG. 2 shows change in vibration level in a scanning measurement according to the first embodiment.

As shown in FIG. 2, the designated scanning measuring force herein is set as a value obtained by subtracting from the voltage level L1 detected when the contact portion 212 is not in contact with the workpiece surface S a first reference level L2 that is the voltage level detected when the contact portion 212 is pressed into the workpiece surface S at a predetermined measuring force. Specifically, when the scanning measurement is conducted at the designated scanning measuring force, the voltage level from the piezoelectric element 218 is constant at the first reference level L2.

The touching-measurement control section 420 detects that the contact portion 212 contacts the workpiece surface S in a touching measurement in which the contact portion 212 is alternately brought into and out of contact (touch) with the workpiece surface S.

The touching-measurement control section 420 includes a contact detecting section 421.

The contact detecting section 421 detects that the measuring section 210 contacts (touches) the workpiece surface S when the measuring force signal from the measuring force detection circuit 219 reaches a touch detecting measuring force, and the contact detecting section 421 outputs a touch detection signal.

Figure 3:
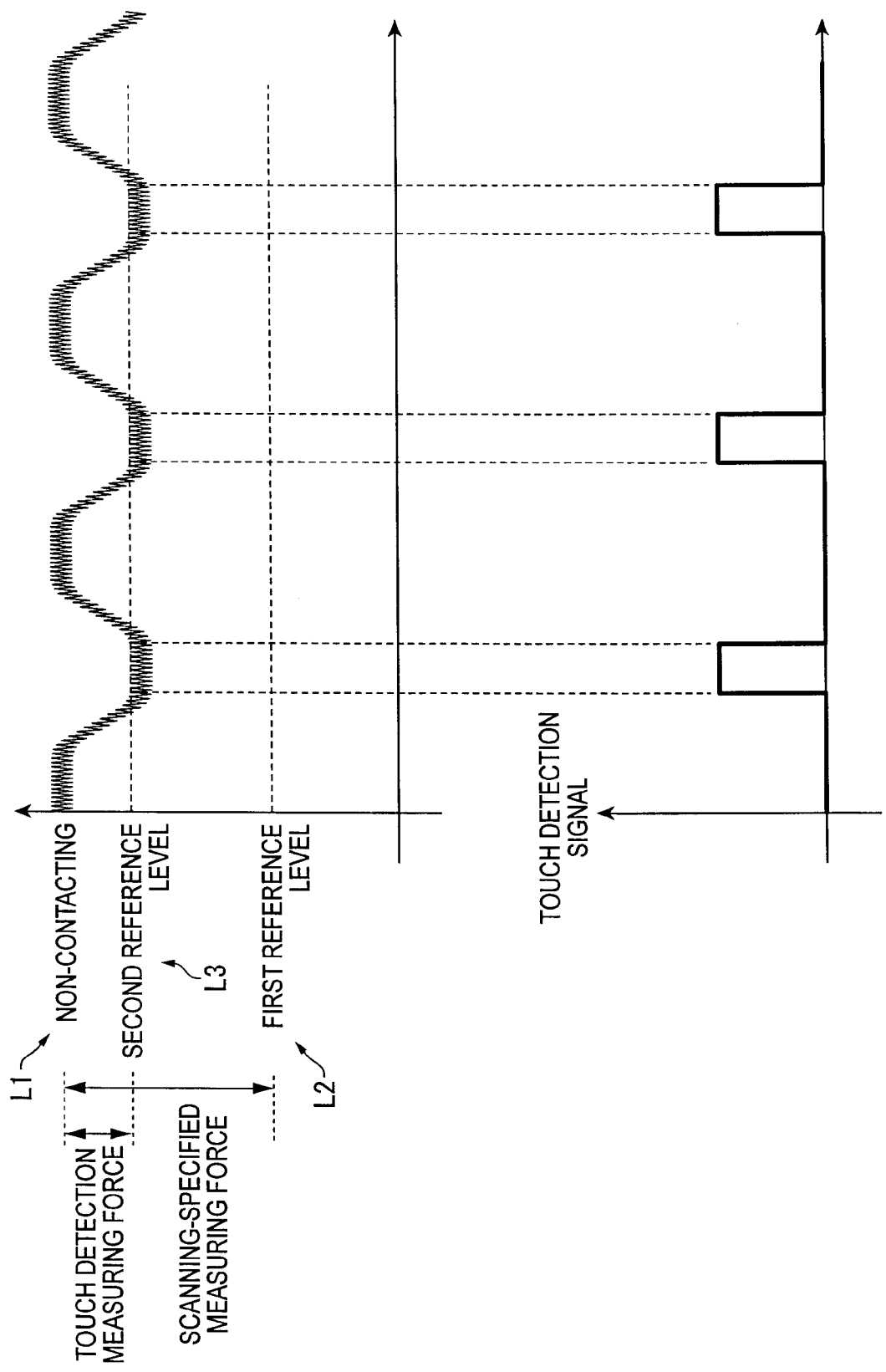
FIG. 3 shows change in vibration level and output timings of touch detection signals in a touching-measurement according to the first embodiment.

As shown in FIG. 3, the touch detecting measuring force herein is set as a value smaller than the designated scanning measuring force. Specifically, the touch detecting measuring force is set as a voltage (a second reference level L3) that is higher than the first reference level L2.

Note that the operation of such a touching-measurement, in which the contact portion 212 is alternately brought into and out of contact (touch) with the workpiece surface S, is conducted by the three-dimensional drive mechanism 300. Specifically, during the touching-measurement, a drive signal to stop the operation of the vertical movement drive mechanism 220 is output to the drive circuit 450 from the touching-measurement control section 420. Thereby, the drive signal input to the drive circuit 450 is fixed at a predetermined value, so that the vertical movement drive mechanism 220 is stopped at a predetermined position. Herein, the vertical movement drive mechanism 220 may be stopped at a predetermined position with a so-called servo lock by using the output of the displacement amount sensor 230 as a returned signal. In addition, a touch signal from the contact detecting section 421 is output to the controller 500 and the controller 500 drives the three-dimensional drive mechanism 300 such that the touching-measurement is conducted in accordance with the touch signal.

The probe counter 430 counts a signal from the displacement amount sensor 230 to count a Z-direction displacement amount of the measuring section 210 caused by the vertical movement drive mechanism 220.

The switching section 440 switches between the scanning-measurement control section 410 and the touching-measurement control section 420, to which the measuring force signal from the measuring force detection circuit 219 is output. The switching section 440 includes a scanning-measurement terminal 441 and a touching-measurement terminal 442, between which a user manually switches with a switching section 443.

The drive circuit 450 outputs a control signal for controlling a vertical movement of the vertical movement drive mechanism 220 in accordance with the drive signal.

For example, when the scanning-measurement control section 410 is activated, a control signal for conducting the scanning-measurement with the measuring force maintained at the designated scanning measuring force is output.

When the touching-measurement control section 420 is activated, a control signal for conducting the touching-measurement is output. Specifically, during the touching-measurement, the operation of the vertical movement drive mechanism 220 is stopped. Note that the probe is displaced only by the three-dimensional drive mechanism 300 in the touching-measurement.

The controller 500 includes a three-dimensional drive mechanism control section 510, a counter unit 520, a profile analyzing section 530 and a CPU (Central Processing Unit) 540.

The three-dimensional drive mechanism control section 510 drives the three-dimensional drive mechanism 300 to move the probe in the X, Y and Z directions. For example, in the scanning-measurement, the probe 200 is moved in a predetermined scanning direction.

Note that it is only necessary that the three-dimensional drive mechanism 300 moves the probe 200 in the scanning direction, since small displacements of the contact portion 212 corresponding to small ridges and valleys of the workpiece surface S is conducted by the vertical movement drive mechanism 220.

In the touching-measurement, the probe 200 is also moved alternately to and from the workpiece surface S.

Concretely, the contact portion 212 is moved so as to approach the workpiece surface S and is pressed thereinto until the touch signal from the contact detecting section 421 generated when the contact portion 212 contacts the workpiece surface S is received. When the touch signal is received, the contact portion 212 is moved away from the workpiece surface S. The contact portion 212 is moved again so as to approach the workpiece surface S at a next sampling point. Note that the next sampling point in the touching-measurement is estimated based on measurement data on a few already measured sampling points.

Herein, the vertical movement drive mechanism control unit 400 and the controller 500 form a drive control unit.

The counter unit 520 includes a three-dimensional counter 521 and a latch counter 522 (a latch counter).

The three-dimensional counter 521 counts the output of linear encoders (not shown) for detecting drive amounts of the three-dimensional drive mechanism 300 in the X, Y and Z directions.

The latch counter 522 receives the touch signal output from the contact detecting section 421 and latches a count value of the three-dimensional counter 521. Specifically, the drive amount of the three-dimensional drive mechanism 300 at the time when the contact portion 212 contacts (touches) the workpiece surface S with the touch detecting measuring force is latched.

Herein, the displacement amount sensor 230 and the linear encoders that detect the drive amounts in the X, Y and Z directions form a displacement detector, and the three-dimensional counter 521 and the probe counter 430 form a counter.

The profile analyzing section 530 calculates a surface profile of the workpiece based on the displacements of the probe and the three-dimensional drive mechanism 300 which are respectively counted by the probe counter 430 and the counter unit 520.

For example, in the scanning-measurement, a movement locus of the contact portion 212 is calculated by using the probe displacement counted by the probe counter 430 and the drive amount of the three-dimensional drive mechanism 300 counted by the three-dimensional counter 521.

The movement locus of the contact portion 212 represents the surface profile of the workpiece.

In the touching-measurement, the profile of the workpiece surface S is analyzed by plotting positions on the workpiece surface S based on the displacement of the three-dimensional drive mechanism 300 which is latched by the latch counter 522.

Note that either in the scanning-measurement or the touching-measurement, the profile analyzing section 530 estimates the surface profile of the workpiece at a next sampling point based on a few already measured points and outputs the estimation to the scanning-measurement control section 410 and the three-dimensional drive mechanism control section 510.

Note that the CPU 540 controls the controller 500 and outputs a command on the designated scanning measuring force to the measuring force comparing section 411.

The operation of the first embodiment having the above-explained arrangement will be described below by exemplifying a measurement of the profile of the workpiece surface S shown in FIG. 4.

Figure 4:
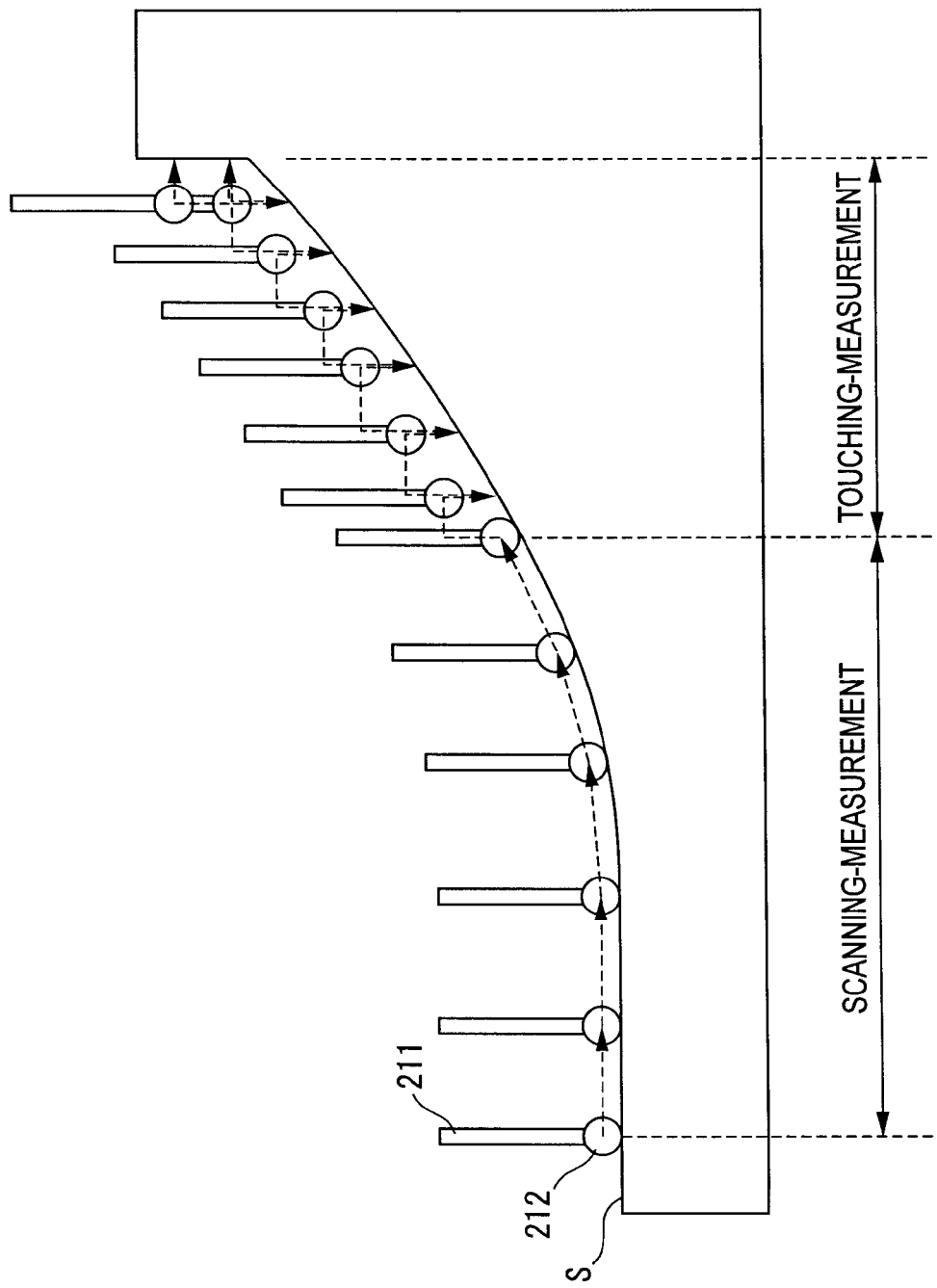
FIG. 4 shows a process of a measurement of a workpiece surface according to the first embodiment.

Herein, the measurement is conducted from left to right in FIG. 4. At the start point of the measurement, the workpiece surface S is a horizontal surface orthogonal to the stylus 211. Hence, the scanning-measurement is to be conducted herein.

For the scanning-measurement, the switching section 443 is manually operated to connect the switching section 440 to the scanning-measurement terminal 441.

In the scanning-measurement, the probe 200 is moved by the three-dimensional drive mechanism 300 in a scanning direction (which is from left to right in FIG. 4). When the contact portion 212 abuts on the workpiece surface S, the measuring force applied from the workpiece surface S to the contact portion 212 is detected by the measuring force detection circuit 219 and the detection result is input to the measuring force comparing section 411 of the scanning-measurement control section 410 via the switching section 440.

The measuring force signal from the measuring force detection circuit 219 is compared with the designated scanning measuring force in the measuring force comparing section 411. Based on the comparison result, the measuring force comparing section 411 outputs the drive signal to the drive circuit 450 such that the measuring force becomes constant at the designated scanning measuring force.

The vertical movement drive mechanism 220 is driven by the signal from the drive circuit 450 to vertically move the contact portion 212 so as to abut on the workpiece at the constant measuring force. Thereby, the scanning-measurement is conducted in accordance with ridges and valleys of the workpiece surface S. The vertical displacement of the measuring section 210 in the scanning-measurement is detected by the displacement amount sensor 230 and a sensor signal from the displacement amount sensor 230 is counted by the probe counter 430, so that the displacement amount of the contact portion 212 caused by the vertical movement drive mechanism 220 is calculated.

The displacement of the probe 200 caused by the three-dimensional drive mechanism 300 is counted by the three-dimensional counter 521. The displacement of the vertical movement drive mechanism 220 counted by the probe counter 430 and the displacement of the three-dimensional drive mechanism 300 counted by the three-dimensional counter 521 are used together by the profile analyzing section 530 to obtain the movement locus of the contact portion 212, thereby obtaining the surface profile of the workpiece.

As the measurement of the workpiece surface S shown in FIG. 4 is proceeded from left to right, the workpiece surface S becomes slant from the horizontal line and the tilt angle gradually becomes larger.

When the tilt angle between the workpiece surface S and the horizontal line becomes larger than a predetermined value, the direction in which the contact portion 212 contacts the workpiece surface S is deviated from the axial direction of the stylus (a measuring force detecting direction), whereby the measuring force cannot be accurately detected. In addition, when the tilt angle of the workpiece surface S becomes large, it is difficult to move the contact portion 212 along the workpiece surface S by making small displacements with the vertical movement drive mechanism 220. Hence, when the tilt angle of the workpiece surface S is large, it is not suitable to continue the scanning-measurement.

When the user judges that it is not suitable to conduct the scanning-measurement, the user may manually operate the switching section 443 to connect the switching section 440 to the touching-measurement terminal 442, thereby changing a measuring mode from the scanning-measurement to the touching-measurement.

In the touching-measurement, the drive of the vertical movement drive mechanism 220 is stopped and the touching-measurement is conducted with the contact portion 212 moved to and form the workpiece surface S by the three-dimensional drive mechanism 300.

When the contact portion 212 is moved toward the workpiece surface S by the three-dimensional drive mechanism 300 into contact with the workpiece surface S, the measuring force applied from the workpiece surface S to the contact portion 212 is detected by the measuring force detection circuit 219. The measuring force signal from the measuring force detection circuit 219 is input to the contact detecting section 421 and compared with the touch detecting measuring force in the contact detecting section 421. The contact portion 212 is pressed into the workpiece surface S until the measuring force signal reaches the touch detecting measuring force, where the touch signal is output from the contact detecting section 421 (see FIG. 3). Note that since the touch detecting measuring force has a smaller value as compared with the designated scanning measuring force, the touch signal is output when the contact portion 212 slightly contacts the workpiece surface S.

The touch signal is input to the three-dimensional drive mechanism control section 510. When the touch signal is received by the three-dimensional drive mechanism control section 510, the contact portion 212 is moved apart from the workpiece surface S. Subsequently, the contact portion 212 is moved to and from the workpiece surface S at a next sampling point. The touch signal is input to the latch counter 522. The latch counter 522, which receives the touch signal, latches the count value of the three-dimensional counter 521 and outputs it to the profile analyzing section 530.

The profile analyzing section 530 plots the positions of the contact portion 212 at the times when the touch signals are output, whereby the surface profile of the workpiece is obtained.

The first embodiment described above can provide advantages below.

(1) When the contacting direction between the contact portion 212 and the workpiece surface S is deviated from the measuring force detecting direction due to the tilt angle of the workpiece surface S or the like, the measuring mode is switched from the scanning-measurement to the touching-measurement. In the touching-measurement, the touch detecting measuring force is set to be smaller than the designated scanning measuring force. Thereby, it is possible to detect that the contact portion 212 contacts the workpiece surface S by detecting a small measuring force. In the touching-measurement, it is possible to detect that the contact portion 212 touches the workpiece surface S at a time when the measuring force signal reaches the touch detecting measuring force having a small value, thereby preventing the contact portion 212 from being pressed too strongly into the workpiece surface S. Since the contact portion 212 and the workpiece surface S are not abutted to each other too strongly in the touching-measurement, deformations of the stylus 211 and the workpiece surface S can be quite small, so that the workpiece surface S can be accurately detected. In other words, even in a portion in which the scanning-measurement cannot be conducted, the workpiece surface S can be accurately measured by the touching-measurement.

(2) When the latch counter 522 receives the touch detection signal in the touching-measurement of the workpiece surface S, the latch counter 522 latches the count value of the three-dimensional counter 521. Hence, the position of the contact portion 212 at the time when the contact portion 212 contacts the workpiece surface S and the touch detecting measuring force is detected can be latched. Based on the latched data, the surface profile of the workpiece can be obtained.

(3) The user can select which portion of the workpiece surface S is to be measured by the scanning-measurement or by the touching-measurement by judging from the tilt angle and curvature of the workpiece surface S to select the measuring mode through switching the switching section 440 using the switching section 443. Hence, as compared with a case in which the profile measuring instrument is adapted to try the scanning-measurement and the touching-measurement and automatically select the most suitable measuring mode, the measuring mode can be selected speedily and appropriately, thereby ensuring an effective measurement.

[Modification 1]

A modification 1 of the invention will be described below with reference to FIG. 5.

Although the basic arrangement of the modification 1 is the same as the first embodiment, the modification 1 includes a switching control section 444 that controls the switching section 440, so that the switching can be automatically conducted based on the measuring force signal.

Figure 5:
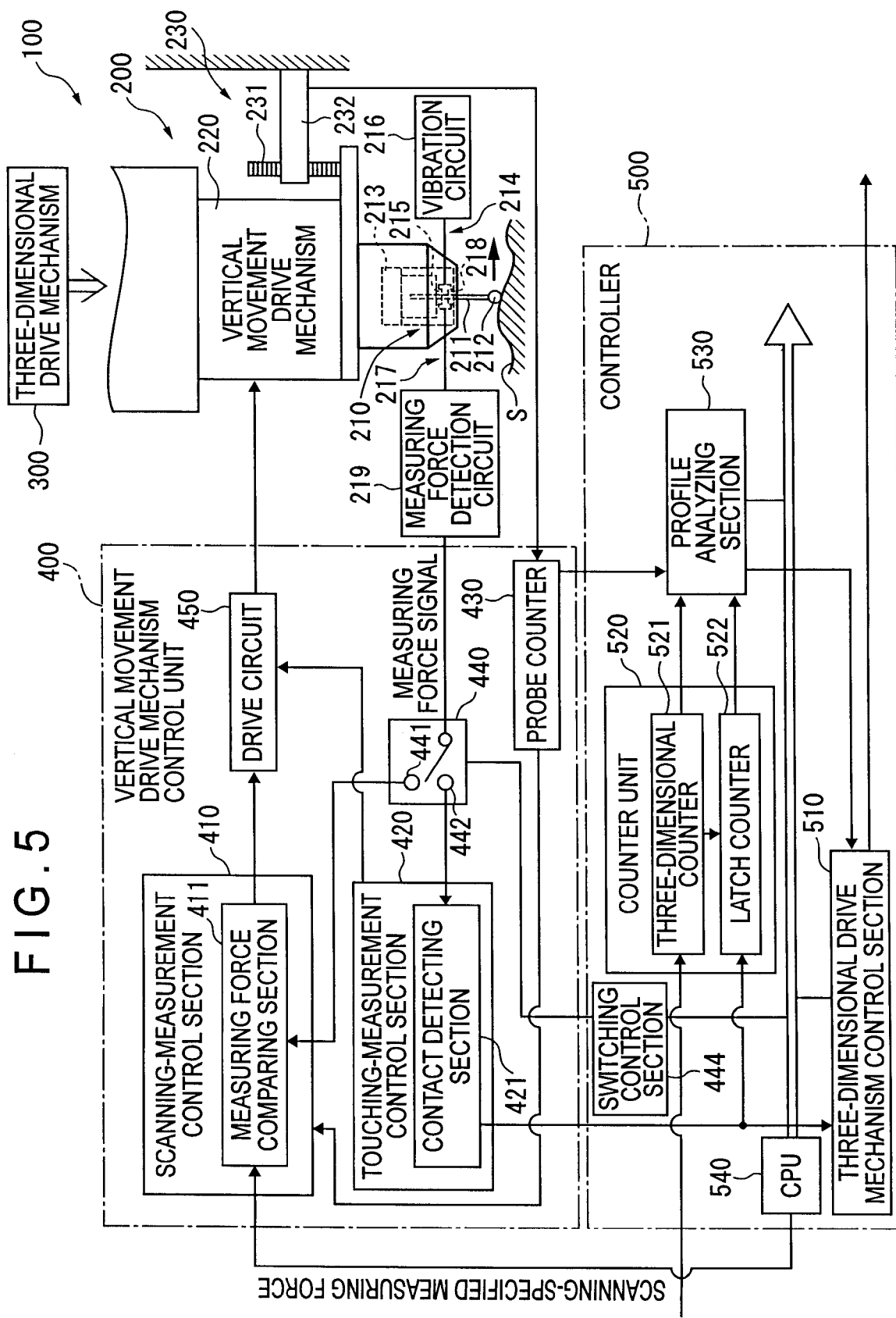
FIG. 5 shows an arrangement of a modification 1 of the invention.

In FIG. 5, the modification 1 includes the switching control section 444 in place for the switching section 443.

The switching control section 444 is input with the measuring force signal from the measuring force detection circuit 219 and controls the switching section 440 in accordance with a change in the measuring force signal. In the scanning-measurement in which the contact portion 212 is pressed to the workpiece surface S such that the measuring force becomes constant at a predetermined designated scanning measuring force, the measuring force is detected in a direction along the axial direction of the stylus 211 by vibrating the contact portion 212 in the axial direction of the stylus 211.

However, when the workpiece surface S is tilted from the horizontal line or from the direction substantially orthogonal to the axial direction of the stylus, the contact portion 212 does not abut on the workpiece surface S in the axial direction of the stylus. Hence, the measuring force signal from the measuring force detection circuit 219 becomes disturbed.

Figure 6:
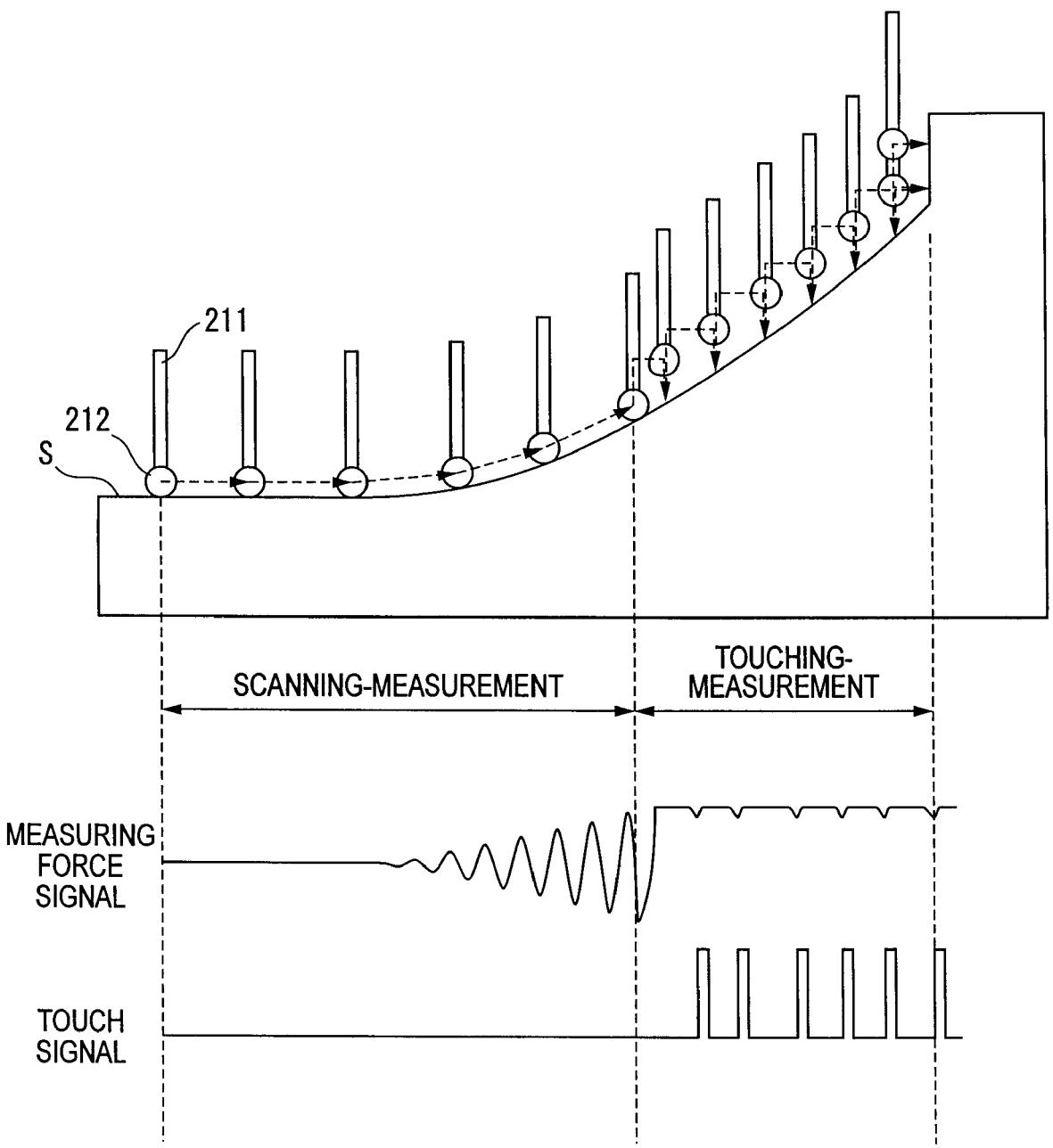
FIG. 6 shows a relationship between a measuring force signal and a switching of a measuring mode according to the modification 1.

For example, as shown in FIG. 6, when the tilt angle of the workpiece surface S becomes large, the measuring force signal cannot be maintained at a constant value in the scanning-measurement, causing a large fluctuation in the measuring force signal. When the fluctuation in the measuring force signal exceeds a predetermined value, the switching section 440 is connected to the touching-measurement terminal 442, thereby changing the measuring mode to the touching-measurement. The touching-measurement is then conducted while detecting the touch signal.

The modification 1 can provide advantages below.

(4) Since the switching control section 444 switches and controls the switching section 440 based on the measuring force detected by the measuring force detection circuit 219, it is not necessary for the user to judge and switch, which simplifies the measurement. Owing to the automatic switching, even when the surface profile cannot be measured by the scanning-measurement, the profile measurement can be automatically conducted in the touching-measurement.

[Modification 2]

The modification 1 has been described above by exemplifying the case in which the switching control section 444 controls the switching section 440 based on the measuring force signal from the measuring force detection circuit 219. However, the switching control section 444 may control the switching section 440 based on the profile of the workpiece surface S.

In the case in which the measuring mode is switched between the scanning-measurement and the touching-measurement based on the profile of the workpiece surface S, the measuring mode may be selected by estimating the workpiece surface S based on the measurement data on the last already measured sampling point. For example, the curvature or the tilt angle of the workpiece surface S may be calculated from the data on a plurality of last already measured points and compared with a predetermined threshold value to make a switch between the scanning-measurement and the touching-measurement. When the curvature of the workpiece surface S is small enough, the scanning-measurement can be conducted. On the other hand, when the curvature is large, the measuring mode is switched to the touching-measurement. When the tilt angle of the workpiece surface S is in a predetermined range from the horizontal line, the scanning-measurement can be conducted. On the other hand, when the tilt angle of the workpiece surface S is beyond the predetermined range, the measuring mode is switched to the touching-measurement.

An alternative way of measurement may be employed, in which the entire surface of the workpiece may be roughly measured in the touching-measurement; the curvatures and the tilt angles of points on the workpiece surface S are calculated from the data of the rough measurement; and the surface profile of the workpiece is measured again while making a switch between the scanning-measurement and the touching-measurement based on the data of the curvatures or the tilt angles.

As another way of measurement, the curvatures or the tilt angles of the workpiece surface S may be calculated in advance based on design data of the workpiece to make a switch between the scanning-measurement and the touching-measurement.

The modification 2 can provide advantages below.

(5) Since the surface profile of the workpiece is analyzed to switch to the touching-measurement based on, for example, the curvatures or the tilt angles of the workpiece, it is not necessary for the user to judge and switch, thereby simplifying the measurement. Owing to the automatic switching, even when the surface profile cannot be measured by the scanning-measurement, the profile measurement can be automatically conducted in the touching-measurement.

[Modification 3]

A modification 3 of the invention will be described below.

Although the basic arrangement of the modification 3 is the same as the first embodiment, the modification 3 is different in that the designated scanning measuring force is variable in the scanning-measurement.

When the curvature or the tilt angle of the workpiece surface S is within a predetermined range, the scanning-measurement is conducted. Herein, the designated scanning measuring force can be changed in accordance with the curvature or the tilt angle of the workpiece surface S. For example, in the scanning-measurement, when the curvature or the tilt angle of the workpiece surface S is large, the designated scanning measuring force is changed to a smaller value in accordance with the curvature or the tilt angle.

When the curvature or the tilt angle of the workpiece surface S is large, the direction in which the contact portion 212 contacts the workpiece surface S becomes deviated from the axial direction of the stylus 211 (the measuring force detecting direction). Herein, only the force component in the axial direction of the stylus out of the measuring force applied from the workpiece surface S to the contact portion 212 is detected by the measuring force detection circuit 219. Hence, when the workpiece surface S is slant and the designated scanning measuring force is controlled based on the measuring force detected by the measuring force detection circuit 219, the actual measuring force between the contact portion 212 and the workpiece surface S is not the designated scanning measuring force, so that the contact portion 212 is pressed too strongly onto the workpiece surface S.

Accordingly, changing the designated scanning measuring force in accordance with the curvature or the tilt angle of the workpiece surface S ensures a scanning-measurement in which the measuring force between the workpiece surface S and the contact portion 212 is accurately maintained constant.

Second Embodiment

A second embodiment of the invention will be described below with reference to FIG. 7.

Although the basic arrangement of the second embodiment is the same as the first embodiment, the second embodiment is different in that a vertical movement drive mechanism 600 of the probe 200 includes a fine feed mechanism 610 that finely moves the measuring section 210 and a coarse feed mechanism 620 that coarsely moves the fine feed mechanism 610 and the measuring section 210.

Specifically, the vertical movement drive mechanism 600 includes the fine feed mechanism 610 having a high response speed and the coarse feed mechanism 620 having a large stroke, whereby, in the scanning-measurement, the fine feed mechanism 610 speedily processes small ridges and valleys of the workpiece surface S and the coarse feed mechanism 620 processes a large change such as an undulation. Thus, the contact portion is accurately and speedily moved for scanning along the workpiece surface in the scanning-measurement.

An arrangement of the second embodiment will be described in detail.

Figure 7:
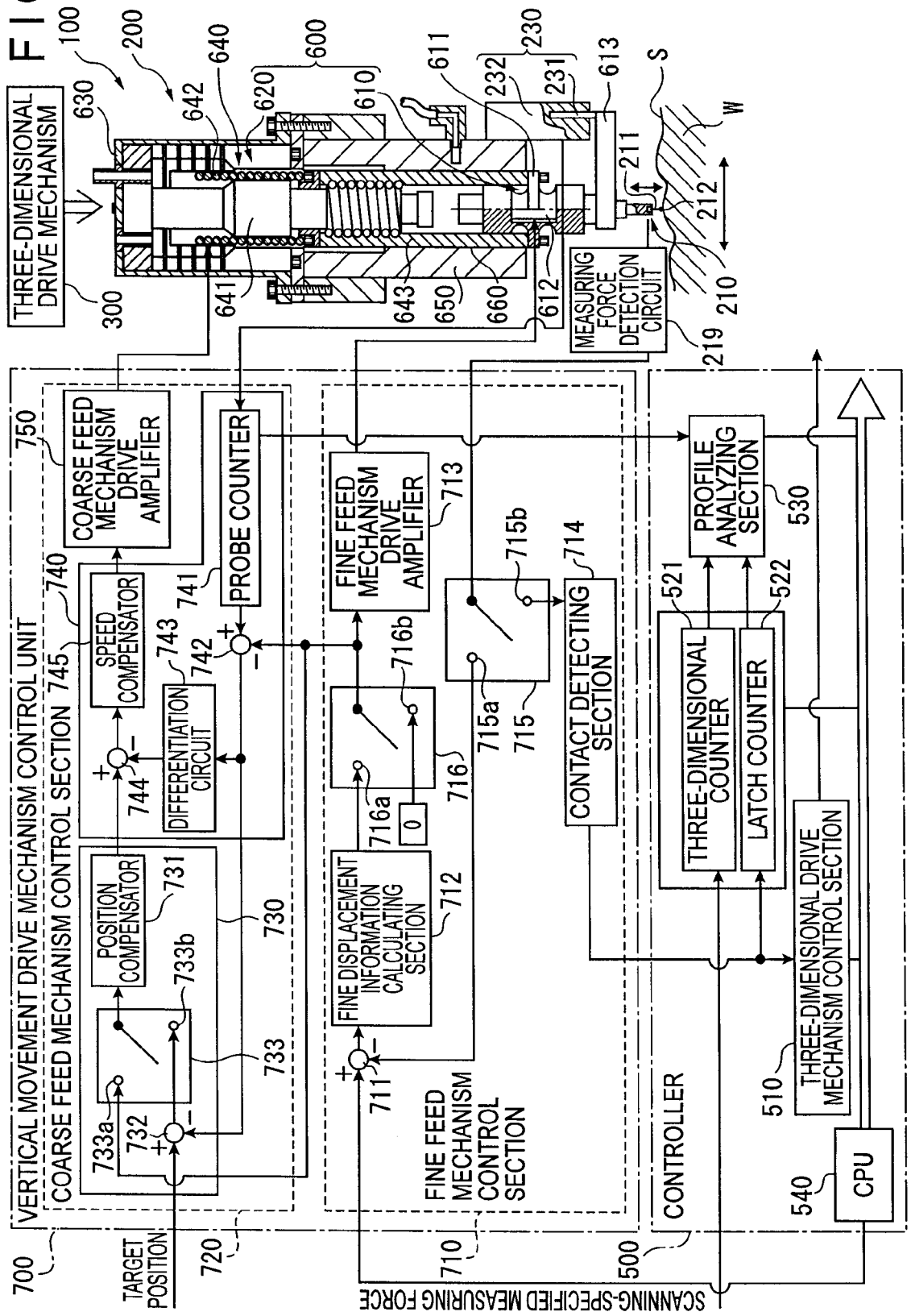
FIG. 7 shows an arrangement of a second embodiment of the invention.

In FIG. 7, the surface profile measuring instrument 100 includes the probe 200, the three-dimensional drive mechanism 300, the vertical movement drive mechanism control unit 700 and the controller 500.

The probe 200 includes the measuring section 210, the vertical movement drive mechanism 600 and the displacement amount sensor 230. The arrangements of the measuring section 210 and the displacement amount sensor 230 are the same as those of the first embodiment.

The vertical movement drive mechanism 600 includes the fine feed mechanism 610 that moves the measuring section 210 in a small range and the coarse feed mechanism 620 that coarsely moves the fine feed mechanism 610 and the measuring section 210. The fine feed mechanism 610 includes: a fine feed fixing portion 611 fixed to a movable portion 643 of the coarse feed mechanism 620; and a piezoelectric element 612 provided to the fine feed fixing portion 611. The measuring section 210 is disposed on the lower side of the piezoelectric element 612.

The coarse feed mechanism 620 includes: a permanent magnet 641 fixed in a housing 630 (a casing); and an electromagnetic actuator 640 having a movable coil 642 that vertically moves in the magnetic field of the permanent magnet 641. At a lower end of the movable coil 642, the movable portion 643 that integrally moves with the movable coil 642. The movable portion 643 is held by an air bearing 660 in a manner smoothly movable to a coarse feed fixing portion 650 integrated with the housing 630. The housing 630 is attached to the three-dimensional drive mechanism 300, and the probe 200 is moved in the three dimensions by X, Y and Z drive axes.

The displacement amount sensor 230 is a linear encoder that includes the scale 231 and the detector head 232. The scale 231 is held by a movable component 613 provided between the lower end of the fine feed mechanism 610 and the upper end of the measuring section 210. The scale 231 moves in a direction parallel to the displacement direction of the fine feed mechanism 610 and the coarse feed mechanism 620. The detector head 232 provided to the coarse feed fixing portion 650 detects the displacement amount of the scale 231. The displacement amount sensor 230 detects the displacement amount of the measuring section 210 from the housing 630. In other words, the displacement amount sensor 230 detects a combined displacement amount of the coarse feed mechanism 620 and the fine feed mechanism 610. The detection result of the displacement amount sensor 230 is output as a displacement amount signal.

The vertical movement drive mechanism control unit 700 includes a fine feed mechanism control section 710 that drives the fine feed mechanism 610 and a coarse feed mechanism control section 720 that drives the coarse feed mechanism 620.

The fine feed mechanism control section 710 includes a measuring force comparing section 711, a fine displacement information calculating section 712, a fine feed mechanism drive amplifier 713, a contact detecting section 714, a first switching section 715 and a second switching section 716. The measuring force comparing section 711 compares the designated scanning measuring force that is set in advance with the measuring force signal from the measuring force detection circuit 219 to output the difference in the measuring force. The fine displacement information calculating section 712 calculates fine displacement information of the fine feed mechanism 610 based on the difference in the measuring force which is output by the measuring force comparing section 711. The fine feed mechanism drive amplifier 713 drives the piezoelectric element 612 of the fine feed mechanism 610 based on the displacement amount information from the fine displacement information calculating section 712. The contact detecting section 714 detects the contact of the measuring section 210 on the workpiece surface S by the measuring force signal from the measuring force detection circuit 219 to output the touch signal. The first switching section 715 makes a switch between the measuring force comparing section 711 and the contact detecting section 714 to which the measuring force signal is output from the measuring force detection circuit 219. The second switching section 716 is disposed between the fine displacement information calculating section 712 and the fine feed mechanism drive amplifier 713.

The measuring force comparing section 711 compares the designated scanning measuring force that is set in advance with the measuring force signal from the measuring force detection circuit 219 and calculates to output the difference between the measuring force that is actually being applied to the measuring section 210 and the designated scanning measuring force that is designated.

The fine displacement information calculating section 712 calculates the displacement amount of the fine feed mechanism 610 which is necessary to maintain the measuring force at the designated scanning measuring force and outputs it as the fine displacement information. The calculation is made based on the signal output by the measuring force comparing section 711 (the difference between the designated scanning measuring force and the measuring force signal). The fine displacement information calculated by the fine displacement information calculating section 712 is output via the second switching section 716 to the fine feed mechanism drive amplifier 713 that drives the piezoelectric element 612 of the fine feed mechanism 610.

The fine feed mechanism drive amplifier 713 is a drive amplifier for driving the piezoelectric element 612. The fine feed mechanism drive amplifier 713 calculates a voltage to be applied to the piezoelectric element 612 based on the displacement amount commanded through the fine displacement information and applies the calculated voltage to the piezoelectric element 612.

The contact detecting section 714 detects that the measuring section 210 contacts the workpiece surface S based on the measuring force signal from the measuring force detection circuit 219.

Similarly to the first embodiment, the contact detecting section 714 of the second embodiment detects the contact by the touch detecting measuring force that is a measuring force smaller than the designated scanning measuring force and outputs the touch signal.

The first switching section 715 includes a scanning-measurement terminal 715a and a touching-measurement terminal 715b. The scanning-measurement terminal 715a is connected to the measuring force comparing section 711. The touching-measurement terminal 715b is connected to the contact detecting section 714.

The second switching section 716 includes a scanning-measurement terminal 716a and a touching-measurement terminal 716b. The scanning-measurement terminal 716a is connected to the fine displacement information calculating section 712. The touching-measurement terminal 716b contains no signals. In other words, the fine feed mechanism 610 is in a fixed state in the touching-measurement.

The coarse feed mechanism control section 720 includes: a coarse displacement control section 730 that controls the displacement amount of the coarse feed mechanism 620; a coarse feed speed control section 740 that controls drive speed of the coarse feed mechanism 620; and a coarse feed mechanism drive amplifier 750 that controls a current amplitude value given to the coarse feed mechanism 620.

The coarse displacement control section 730 includes: a position compensator 731 that generates a speed command value of the coarse feed mechanism 620; a position comparator 732; and a third switching section 733.

The position compensator 731 generates the speed command value of the coarse feed mechanism 620 based on the signal input via the third switching section 733. The position compensator 731 may include a phase compensator, a PI compensator, a filter or the like. The output from the position compensator 731 is sent to the subsequent coarse feed speed control section 740 as the speed command value of the coarse feed mechanism 620.

The position comparator 732 is input with a command on a fixed position of the coarse feed mechanism 620 and the current displacement amount information of the coarse feed mechanism 620 in the touching-measurement. In the touching-measurement in which the coarse feed mechanism 620 is not driven but fixed at a predetermined position, the coarse feed mechanism 620 is fixed at a fixed command position. The position comparator 732 is input with a value obtained by subtracting the fine displacement information from the displacements of the coarse feed mechanism 620 and the fine feed mechanism 610 that are counted by a probe counter 741 (the displacement amount of the coarse feed mechanism 620). The position comparator 732 outputs the difference between the fixed position command and the displacement amount of the coarse feed mechanism 620 to the touching-measurement terminal 733b.

The third switching section 733 switches the input signal for the position compensator 731 to a scanning-measurement terminal 733a or a touching-measurement terminal 733b depending on whether the measuring mode is the scanning-measurement or the touching-measurement. The scanning-measurement terminal 733a contains the fine displacement information calculated by the fine displacement information calculating section 712.

The coarse feed speed control section 740 includes the probe counter 741, a displacement comparator 742, a differentiator 743, a speed comparator 744, and a speed compensator 745. The displacement comparator 742 compares the displacement information by the probe counter 741 with the fine displacement information by the fine displacement information calculating section 712 to output the difference therebetween. The differentiator 743 differentiates the calculation result by the displacement comparator 742 to obtain speed information. The speed comparator 744 compares the speed information from the differentiator 743 with the coarse feed speed command value from the coarse displacement control section 730 to calculate the difference therebetween (a speed deviation). The speed compensator 745 generates a current amplitude command value from the signal value from the speed comparator 744.

The displacement comparator 742 compares the fine displacement information calculated by the fine displacement information calculating section 712 with the displacement amount of the measuring section 210 calculated by the probe counter 741 to calculate the difference therebetween. The differentiator 743 calculates a differential value of the output value from the displacement comparator 742. Herein, the differential value of the fine displacement information is the drive speed of the fine feed mechanism 610. The differential value of the displacement amount of the measuring section 210 is the combined drive speed of the fine feed mechanism 610 and the coarse feed mechanism 620. Accordingly, the output value from the differentiator 743 is the speed of the coarse feed mechanism 620. The speed of the coarse feed mechanism 620 can be stabilized by providing a loop for the speed feedback.

The speed comparator 744 compares the coarse feed speed command value from the coarse displacement control section 730 with the speed information from the differentiator 743 to calculate the difference therebetween and outputs a signal on the drive speed to be added to the coarse feed mechanism 620.

The speed compensator 745 performs a characteristic compensation on the signal from the speed comparator 744 and obtains the current amplitude value to be applied to the coarse feed mechanism 620 based on the signal (the speed information) from the speed comparator 744 in order to attain the speed obtained by the speed comparator 744. The speed compensator 745 is for improving frequency characteristic and may include a phase compensator, a PI compensator, a filter or the like. The current amplitude command value obtained by the speed compensator 745 is sent to the coarse feed mechanism drive amplifier 750.

The coarse feed mechanism drive amplifier 750 may include a coil amplifier that drives the electromagnetic actuator 640 (the coarse feed mechanism 620) and applies to the movable coil 642 a current suitable for the speed to be added to the coarse feed mechanism 620 based on the current command value from the speed compensator 745.

The arrangement of the controller 500 is the same as the first embodiment. The controller 500 includes the counter unit 520 having the three-dimensional counter 521 and the latch counter 522, the profile analyzing section 530, the three-dimensional drive mechanism control section 510 and the CPU 540.

The operation of the second embodiment having the above-explained arrangement will be described below First, the scanning-measurement in the second embodiment will be described.

When the scanning-measurement is conducted, the first switching section 715, the second switching section 716 and the third switching section 733 are respectively switched to the scanning-measurement terminals 715a, 716a, 733a. And the designated scanning measuring force is then input to the measuring force comparing section 711. The vertical movement drive mechanism 600 (the fine feed mechanism 610, the coarse feed mechanism 620) is controlled by the vertical movement drive mechanism control unit 700 so as to have the designated scanning measuring force.

The contact portion 212 is brought into contact with the workpiece surface S, and the probe 200 is moved along the X and Y axes of the three-dimensional drive mechanism 300 to which the vertical movement drive mechanism 600 is attached (along the drive axes for moving the measuring section 210 to trace on the workpiece surface S). When the contact portion 212 abuts on the workpiece surface S, the measuring force applied from the workpiece surface S to the contact portion 212 is detected by the measuring force detection circuit 219 and the detection result is input to the measuring force comparing section 711 via the first switching section 715. The measuring force comparing section 711 compares the designated scanning measuring force with the measuring force signal to calculate the difference therebetween (a measuring force deviation) to output it to the fine displacement information calculating section 712.

The fine displacement information calculating section 712 calculates a movement amount of the contact portion 212 which is necessary to eliminate the deviation between the designated scanning measuring force and the detected measuring force and outputs it as the fine displacement information.

The fine displacement information output from the fine displacement information calculating section 712 is branched: a portion thereof is sent to the fine feed mechanism drive amplifier 713 to drive the fine feed mechanism 610; the other is sent to the coarse feed mechanism control section 720 to drive and control the coarse feed mechanism 620. The fine feed mechanism drive amplifier 713 applies to the piezoelectric element 612 of the fine feed mechanism 610 a voltage value that is necessary to drive the fine feed mechanism 610 by the displacement amount commanded by the fine displacement information. Thereby, the measuring section 210 is displaced such that the measuring force becomes constant at the designated scanning measuring force.

The fine displacement information calculated by the fine displacement information calculating section 712 is further branched in the coarse feed mechanism control section 720: a portion thereof is sent to the position comparator 732 to form a loop for control of the displacement amount of the coarse feed mechanism 620; the other is sent to the displacement comparator 742 to form a loop for speed control of the coarse feed mechanism 620.

The fine displacement information is sent to the position compensator 731 via the scanning-measurement terminal 715a of the first switching section 715 and is output to the speed comparator 744 as a speed command that is necessary to compensate the displacement of the fine feed mechanism 610 and bring the displacement of the fine feed mechanism 610 within a predetermined fine range.

The displacement of the contact portion 212 is detected by a displacement detecting sensor and sent to the probe counter 741 as the displacement amount signal. The displacement amount signal is counted by the probe counter 741, and the displacement of the contact portion 212 (the combined displacement of the coarse feed mechanism 620 and the fine feed mechanism 610) is calculated. The displacement amount of the contact portion 212 which is counted by the probe counter 741 is sent to the displacement comparator 742. Meanwhile, the actual displacement amount of the contact portion 212 from the probe counter 741 is sent to the profile analyzing section 530 to be the measurement data therein.

The fine displacement information and the displacement information output from the probe counter 741 are compared with each other by the displacement comparator 742 and the difference therebetween is calculated. The output from the displacement comparator 742 is sent to the differentiator 743 and differentiated to be output to the speed comparator 744 as the speed information.

In the speed comparator 744, the output value from the position compensator 731 and the speed information from the differentiator 743 are compared with each other and the difference therebetween is calculated. The calculation result is the speed to be further added to the coarse feed mechanism 620 and is converted by the speed compensator 745 into the current amplitude value to be further added to the coarse feed mechanism 620. The output from the speed compensator 745 is the current amplitude value to be further added to the coarse feed mechanism 620 and is output to the coarse feed mechanism drive amplifier 750. The coarse feed mechanism drive amplifier 750 applies a voltage to the movable coil 642 of the coarse feed mechanism 620 based on the current amplitude value input from the speed compensator 745. Accordingly, the movable coil 642 is displaced in the magnetic field of the permanent magnet 641, and the coarse feed mechanism 620 is driven. The displacement of the movable coil 642 causes the displacement of the movable portion 643, thereby causing the displacement of the fine feed mechanism 610 and the measuring section 210.

Thus, the fine feed mechanism 610 and the coarse feed mechanism 620 move the measuring section 210.

The displacement amount of the contact portion 212 is output from the probe counter 741 to the profile analyzing section 530. The displacement amount of the contact portion 212 counted by the probe counter 741 and the drive amount of the three-dimensional drive mechanism 300 are processed into the measurement data of the workpiece surface S.

Next, the touching-measurement in the second embodiment will be described.

When the touching-measurement is conducted, the first switching section 715, the second switching section 716 and the third switching section 733 are respectively connected to the touching-measurement terminals 715b, 716b, 733b. And the information on the fixed position of the coarse feed mechanism 620 is input to the position comparator 732. The difference between the displacement of the contact portion counted by the probe counter 741 and the fine displacement information from the fine displacement information calculating section 712 is output from the displacement comparator 742 to be input to the position comparator 732 of the third switching section 733. The position comparator 732 outputs a signal to move the coarse feed mechanism 620 to the fixed position and a predetermined voltage is applied from the touching-measurement terminal 733b via the coarse feed speed control section 740 and the coarse feed mechanism drive amplifier 750 to the movable coil 642 such that the movable coil 642 of the coarse feed mechanism 620 is controlled to the fixed position. Accordingly, the coarse feed mechanism 620 is fixed at the fixed position. When the second switching section 716 is switched to the touching-measurement terminal 716b, the touching-measurement terminal 716b is input with a signal, for example, "0", the fine feed mechanism 610 is not driven and the piezoelectric element 612 is in an unaffected state having a normal length. Herein, the piezoelectric element 612 may be positioned at a predetermined position by adding a predetermined signal to the touching-measurement terminal 716b.

In the aforesaid state, the probe 200 is moved by the three-dimensional drive mechanism 300 to conduct the touching-measurement. More specifically, the contact portion 212 is moved toward the workpiece surface S by the three-dimensional drive mechanism 300, and when the contact portion 212 contacts the workpiece surface S, the measuring force applied from the workpiece surface S to the contact portion 212 is detected by the measuring force detection circuit 219. The measuring force signal from the measuring force detection circuit 219 is input via the first switching section 715 to the contact detecting section 714 and is compared therein with the touch detecting measuring force. The contact portion 212 is pressed into the workpiece surface S until the measuring force signal reaches the touch detecting measuring force, where the touch signal is output from the contact detecting section 714.

The touch signal is input to the three-dimensional drive mechanism control section 510. When the touch signal is received by the three-dimensional drive mechanism control section 510, the contact portion 212 is moved apart from the workpiece surface S. Subsequently, the contact portion 212 is moved to and from the workpiece surface S at a next sampling point. The touch signal is input to the latch counter 522. The latch counter 522, which receives the touch signal, latches the count value of the three-dimensional counter 521 and outputs it to the profile analyzing section 530. The profile analyzing section 530 plots the positions of the contact portion 212 at the times when the touch signals are output, whereby the profile of the workpiece surface S is obtained.

The second embodiment having the above-described arrangement can provide advantages below.

Figure 8:
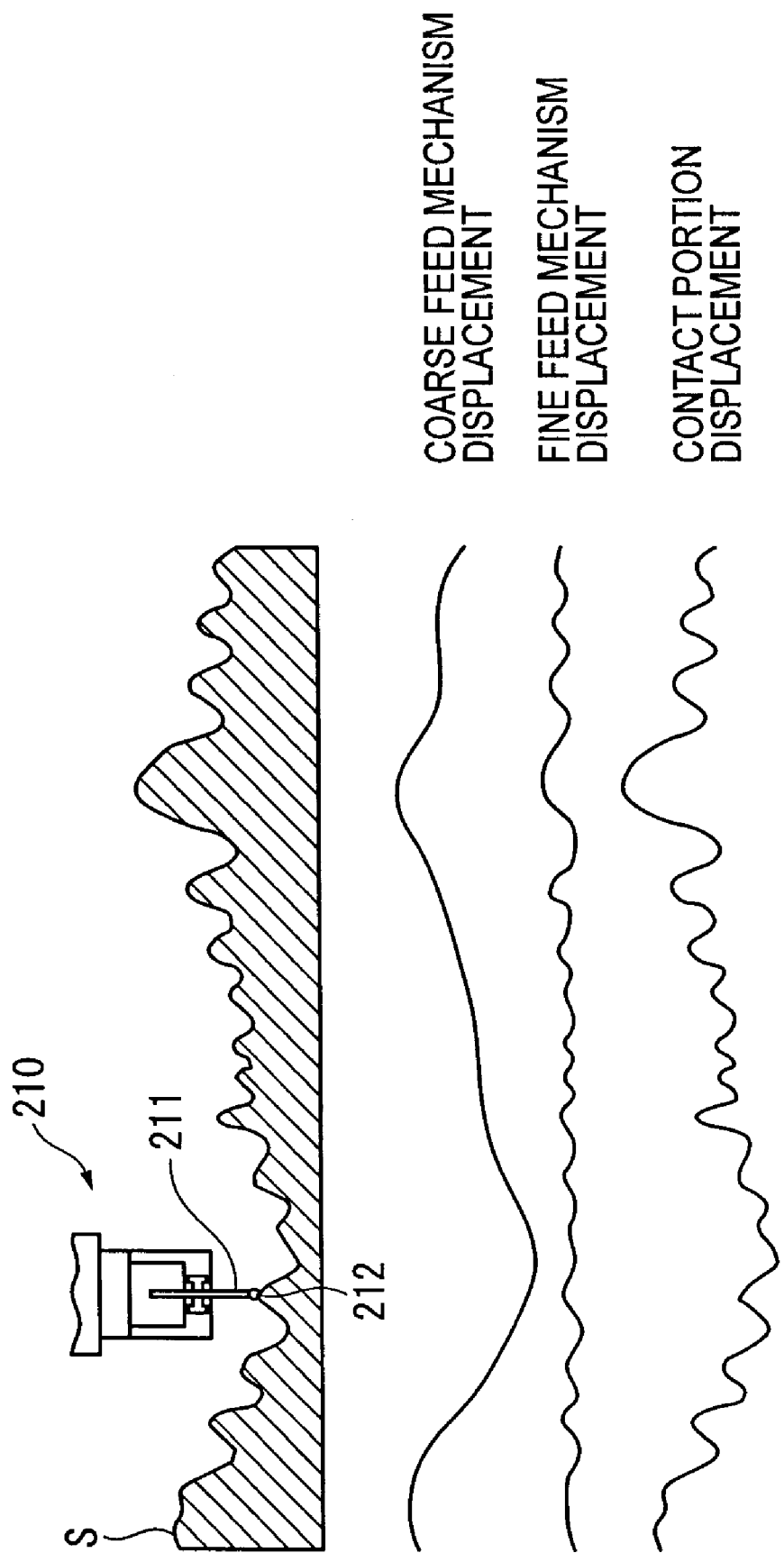
FIG. 8 shows a scanning on the workpiece surface using a fine feed mechanism and a coarse feed mechanism.
Figure 9:
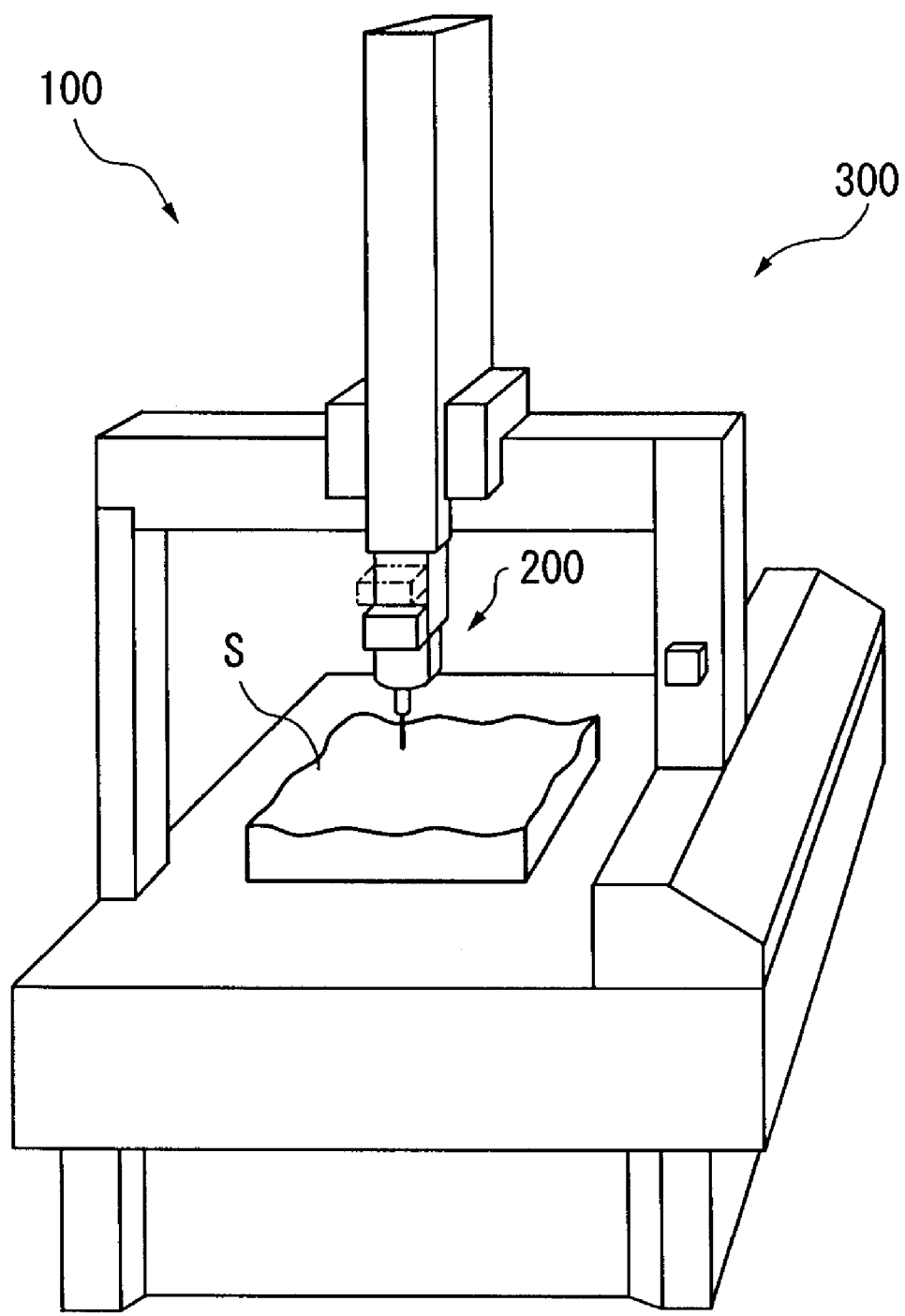
FIG. 9 shows an arrangement of a profile measuring instrument using a probe.
Figure 10:
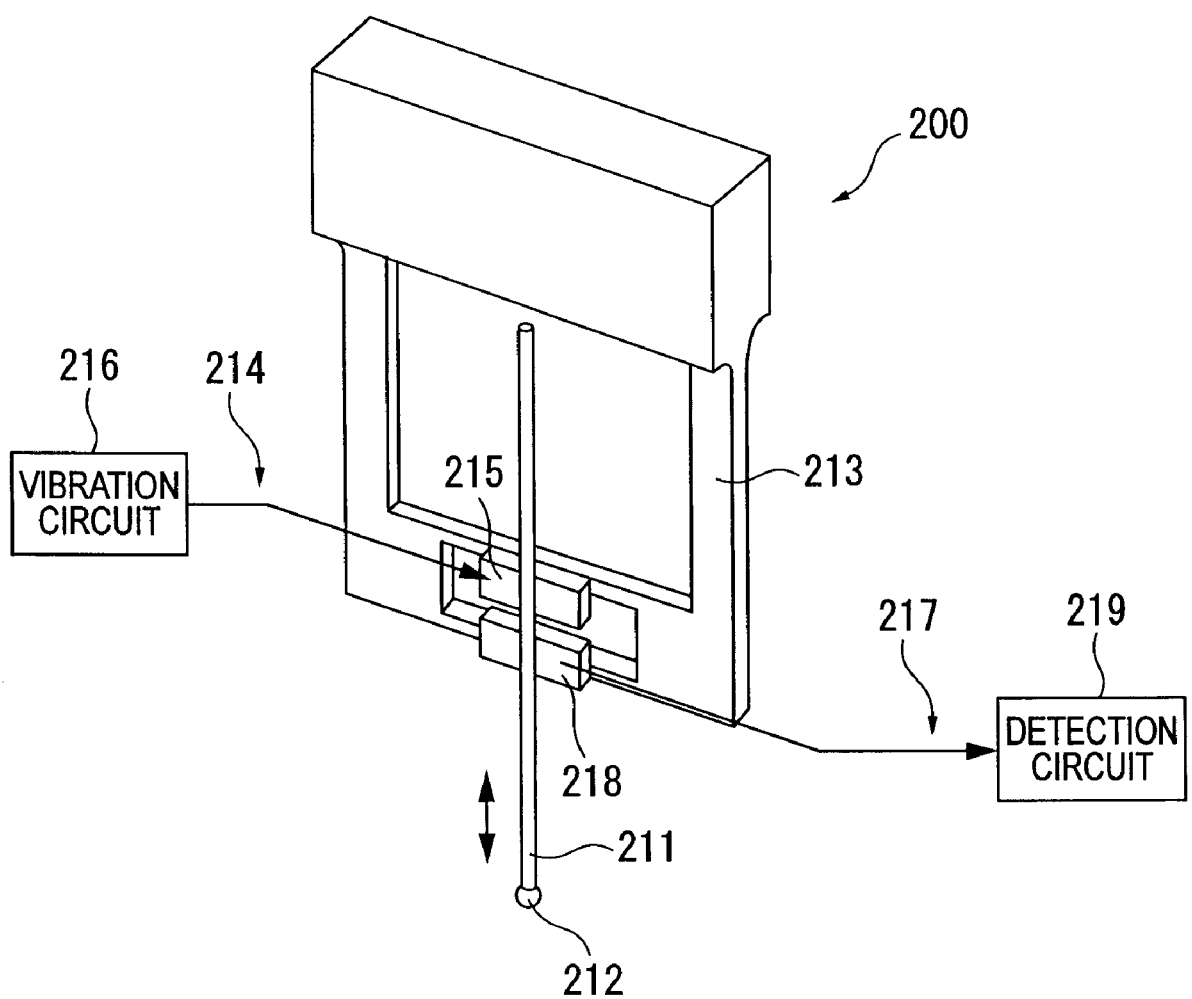
FIG. 10 shows an arrangement of a vibrating contact-type probe.
Figure 11:
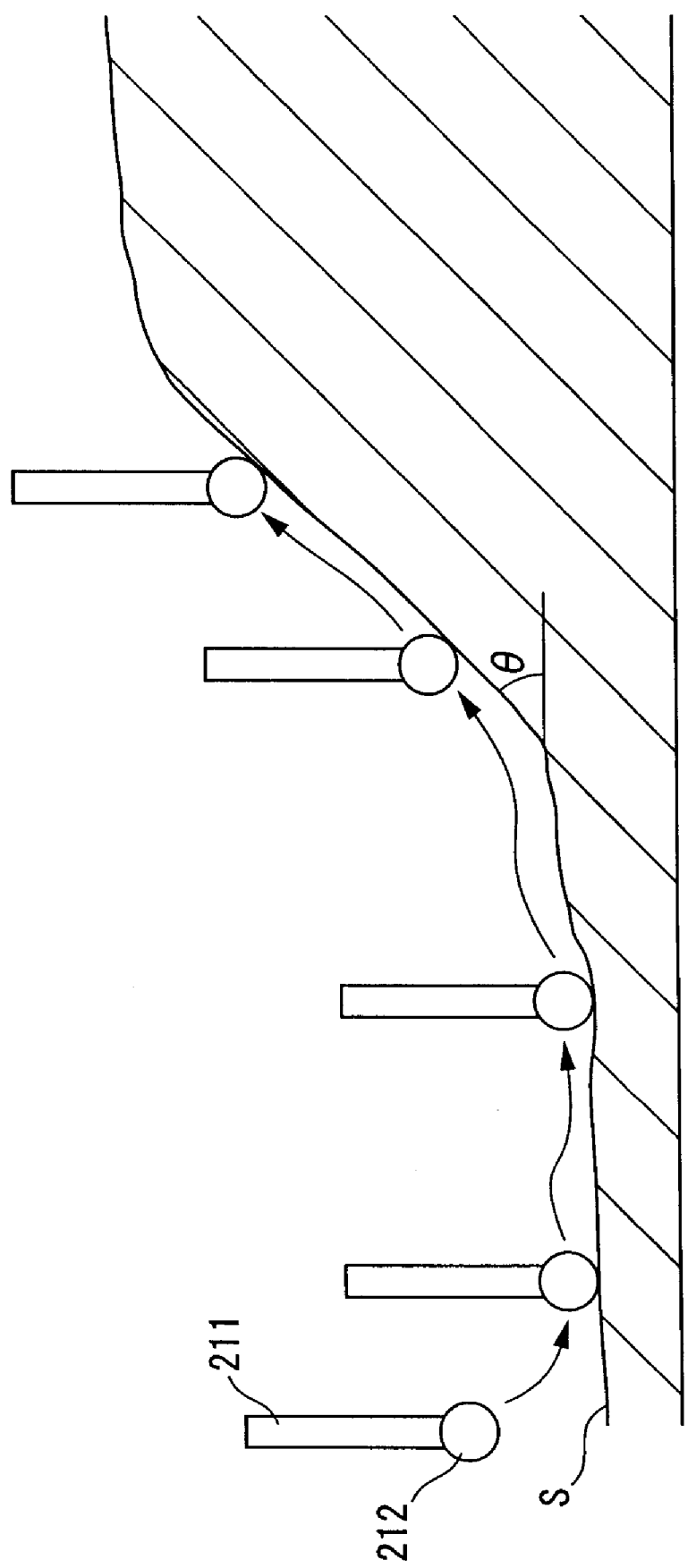
FIG. 11 shows a process of a scanning-measurement of the workpiece surface using the probe.
Figure 12:
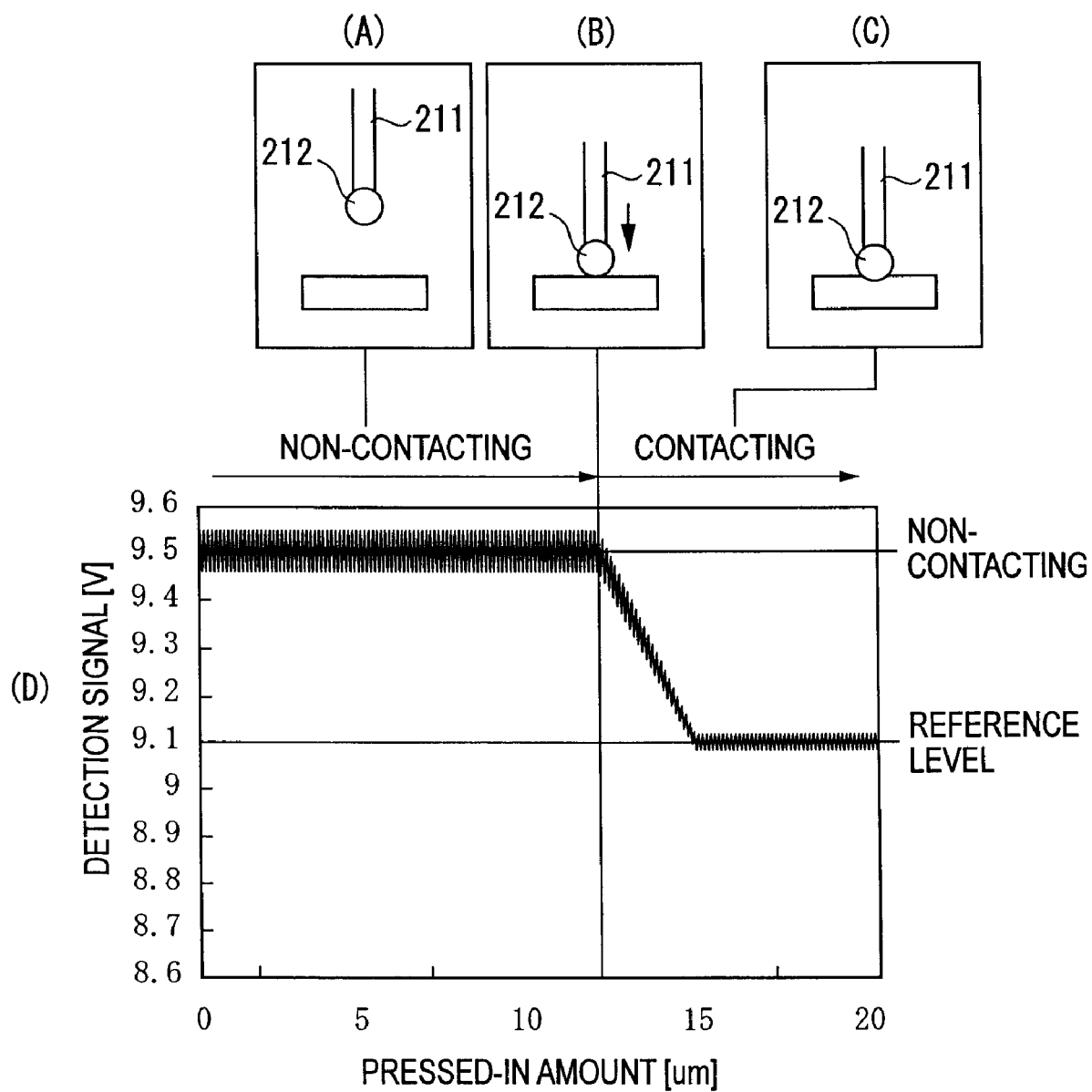
FIG. 12 explains change in detection signal when the probe is in contact with the workpiece surface.

Since the fine feed mechanism 610 and the coarse feed mechanism 620 are provided, in the scanning-measurement, the fine feed mechanism 610, which response speed is high, can finely move the contact portion 212 for small ridges and valleys of the workpiece surface S, and the coarse feed mechanism 620, which can process a large change, can process a large profile change of the workpiece surface S (such as an undulation) (see FIG. 8).

[Modification 4]

A modification 4 of the invention will be described below.

When the workpiece surface S is slant, the contact portion 212 abuts on the workpiece surface S in a direction deviated from the axial direction of the stylus. At this time, the stylus 211 receives a force in a direction crossing the axial direction thereof, so that the stylus 211 is flexed. When the stylus has the flexure, the abutting position between the contact portion 212 and the workpiece surface S becomes deviated by the amount of the flexure. To deal with this, the profile analyzing section 530 is set with compensation parameters for the X, Y and Z directions, which are determined from the tilt angle of the workpiece surface S and the measuring force in the measurement, and the detected measurement data is compensated using the compensation parameters. According to the arrangement, even when the workpiece surface S has a slant portion, the profile of the workpiece surface S can be obtained accurately.

Note that the scope of the present invention is not restricted to the above-described embodiments, but includes modifications and improvements as long as an object of the present invention can be achieved.

For example, although the measuring force detecting unit includes the vibrator and the detector in the aforesaid embodiments, a strain gauge may be used for detecting the measuring force.

Although the switching operation of the first switching section 715, the second switching section 716 and the third switching section 733 according to the second embodiment is not described above, the switching may be operated manually like in the first embodiment or automatically like the modifications 1 and 2.

In the aforesaid embodiments, the latch counter 522 has been described as the latch counter that latches the three-dimensional counter 521. However, the arrangement is not limited thereto but a probe latch counter that latches the probe counter 430 may be provided such that the latch counter 522 and the probe latch counter form the latch counter. The profile of the workpiece surface may be calculated based on the position of the contact portion 212 which is latched by these two latch counters. It is preferable that such probe latch counter is also used in order to ensure an accurate measurement, since when the vertical movement drive mechanism 220 is stopped at a predetermined position by the servo lock or the like, the measuring section 210 may be finely moved (or finely moved due to temperature drift) in the touching-measurement.

In the aforesaid embodiments, the linear encoder has been described as one example of the displacement detector, but the displacement detector is not limited thereto. An analog-type detector or a non-contact type detector such as an interferometer may be used. The counter may be a counter that outputs the output of the analog-type detector in an A/D converted digital amount or in an analog amount.

The priority application Number JP2005-254016 upon which this patent application is based is hereby incorporated by reference.

What is claimed is:

1. A surface profile measuring instrument, comprising:
a measuring section including a stylus having a contact portion to contact a workpiece surface at a tip end and a measuring force detecting unit which detects a measuring force when the contact portion abuts on the workpiece surface;
a moving unit which moves the measuring section relative to the workpiece surface; and
a drive control unit which controls the moving unit based on the magnitude of the measuring force detected by the measuring force detecting unit, the contact portion being brought into contact with the workpiece surface to measure the workpiece surface, wherein
the drive control unit includes: a scanning-measurement control section which controls the moving unit such that the moving unit conducts a scanning-measurement in which the measuring force is a preset designated scanning measuring force and the contact portion is moved for scanning along the workpiece surface; and a touching-measurement control section which controls the moving unit such that the moving unit repeatedly conducts touching-measurements on the workpiece surface, in the touching measurements the contact portion being brought into and then out of contact with the workpiece surface, the contact portion contacting the workpiece surface at a touch detecting measuring force set smaller than the designated scanning measuring force, the measuring force detecting unit has a predetermined measuring force detecting direction, the measuring force detecting unit detecting the measuring force acting in the direction, when the contact portion contacts the workpiece surface in a direction along the measuring force detecting direction, the scanning-measurement control section conducts the scanning-measurement, and when the contact portion contacts the workpiece surface in a direction deviated from the measuring force detecting direction, the touching-measurement control section conducts the touching-measurement.

2. The surface profile measuring instrument according to claim 1, further comprising:

a displacement detector which detects a displacement of the contact portion to output a displacement detection signal, wherein the touching-measurement control section includes a contact detecting section which outputs a touch detection signal when the measuring force reaches the touch detecting measuring force, and the drive control unit includes: a counter which counts the displacement detection signal to calculate a position of the contact portion; a latch counter which receives the touch detection signal and latches the position of the contact portion which is counted by the counter; and a profile analyzing section which calculates a surface profile of the workpiece based on the position of the contact portion calculated by the counter and the position of the contact portion latched by the latch counter.

3. The surface profile measuring instrument according to claim 1, wherein the drive control unit includes a switching section for selecting the scanning-measurement control section or the touching-measurement control section as the one to be operated, and the switching section is switched in accordance with a selection by a user depending on the profile of the workpiece surface.

4. The surface profile measuring instrument according to claim 1, wherein the drive control unit includes: a switching section for selecting the scanning-measurement control section or the touching-measurement control section as the one to be operated; and a switching control section which controls the switching of the switching section, and the switching control section switches and controls the switching section based on a change in the measuring force detected by the measuring force detecting unit.

5. The surface profile measuring instrument according to claim 1, wherein the drive control unit includes: a switching section for selecting the scanning-measurement control section or the touching-measurement control section as the one to be operated; and a switching control section which controls the switching of the switching section, and the switching control section switches and controls the switching section based on the surface profile of the workpiece.

6. The surface profile measuring instrument according to claim 1, wherein the scanning-measurement control section changes the designated scanning measuring force in accordance with an angle formed by the workpiece surface and the measuring force detecting direction.

7. The surface profile measuring instrument according to claim 1, wherein the touching-measurement control section changes the touch detecting measuring force in accordance with the angle formed by the workpiece surface and the measuring force detecting direction.

8. The surface profile measuring instrument according to claim 1, wherein the moving unit includes: a fine feed mechanism which finely moves the measuring section; and a coarse feed mechanism which moves the fine feed mechanism and the measuring section more coarsely than the fine feed mechanism.

* * * * *